(12) United States Patent
Moule et al.

(10) Patent No.: US 11,757,388 B2
(45) Date of Patent: Sep. 12, 2023

(54) METHOD OF CHARACTERISING A SYNCHRONOUS MOTOR

(71) Applicants: TRW Limited, Solihull (GB); TRW Automotive GmbH, Alfdorf (DE)

(72) Inventors: David Moule, Birmingham (GB); Luis Ayala, Radolfzell (DE); Albert Schwinn, Radolfzel (DE)

(73) Assignees: TRW AUTOMOTIVE GMBH, Alfdorf (DE); TRW LIMITED, Solihull (GB)

( * ) Notice: Subject to any disclaimer, the term of this patent is extended or adjusted under 35 U.S.C. 154(b) by 860 days.

(21) Appl. No.: 16/695,222

(22) Filed: Nov. 26, 2019

(65) Prior Publication Data

US 2020/0186069 A1 Jun. 11, 2020

(30) Foreign Application Priority Data

Dec. 7, 2018 (GB) ...................................... 1820001

(51) Int. Cl.
*H02P 21/00* (2016.01)
*G06F 30/23* (2020.01)
*G06F 111/10* (2020.01)

(52) U.S. Cl.
CPC .......... *H02P 21/0017* (2013.01); *G06F 30/23* (2020.01); *H02P 21/0025* (2013.01); *G06F 2111/10* (2020.01)

(58) Field of Classification Search
CPC ........................ H02P 21/0017; H02P 21/0025
See application file for complete search history.

(56) References Cited

U.S. PATENT DOCUMENTS

| | | | |
|---|---|---|---|
| 2002/0185989 A1* | 12/2002 | Rahman | H02P 25/098 318/701 |
| 2004/0095089 A1* | 5/2004 | Collier-Hallman | B62D 5/046 318/567 |
| 2008/0079378 A1* | 4/2008 | Nakatsugawa | H02P 27/04 318/430 |
| 2009/0030645 A1 | 1/2009 | Gotz et al. | |
| 2012/0074879 A1* | 3/2012 | Fahimi | H02P 23/12 318/400.04 |
| 2013/0175955 A1* | 7/2013 | Son | H02P 21/14 318/400.02 |
| 2014/0340006 A1* | 11/2014 | Chen | H02P 25/089 318/254.1 |
| 2015/0295531 A1* | 10/2015 | Kim | H02P 23/14 318/400.22 |
| 2019/0020247 A1* | 1/2019 | Shahi | H02K 11/27 |
| 2019/0256128 A1 | 8/2019 | Takase et al. | |

FOREIGN PATENT DOCUMENTS

CN 106788045 5/2017

* cited by examiner

*Primary Examiner* — Kawing Chan
(74) *Attorney, Agent, or Firm* — TAROLLI, SUNDHEIM, COVELL & TUMMINO L.L.P.

(57) ABSTRACT

A method suitable for characterizing a motor, for instance a permanent magnet synchronous motor, includes obtaining a plurality of winding flux linkage values or terminal voltages of the motor, each corresponding to a different combination of phase current magnitude and phase advance. The resultant flux-linkage values or terminal voltages are transformed into the rotor dq reference frame. The flux linkage model is fitted to the one or more dq-axis flux-linkage values or terminal voltages and their linked phase current magnitude and phase advance using a process of parametric optimisation.

25 Claims, 15 Drawing Sheets

Relative permeability of steel.

One pole magnetic equivialent circuit.

IPMSM d-axis Flux linkage.

IPMSM q-axis Flux linkage.

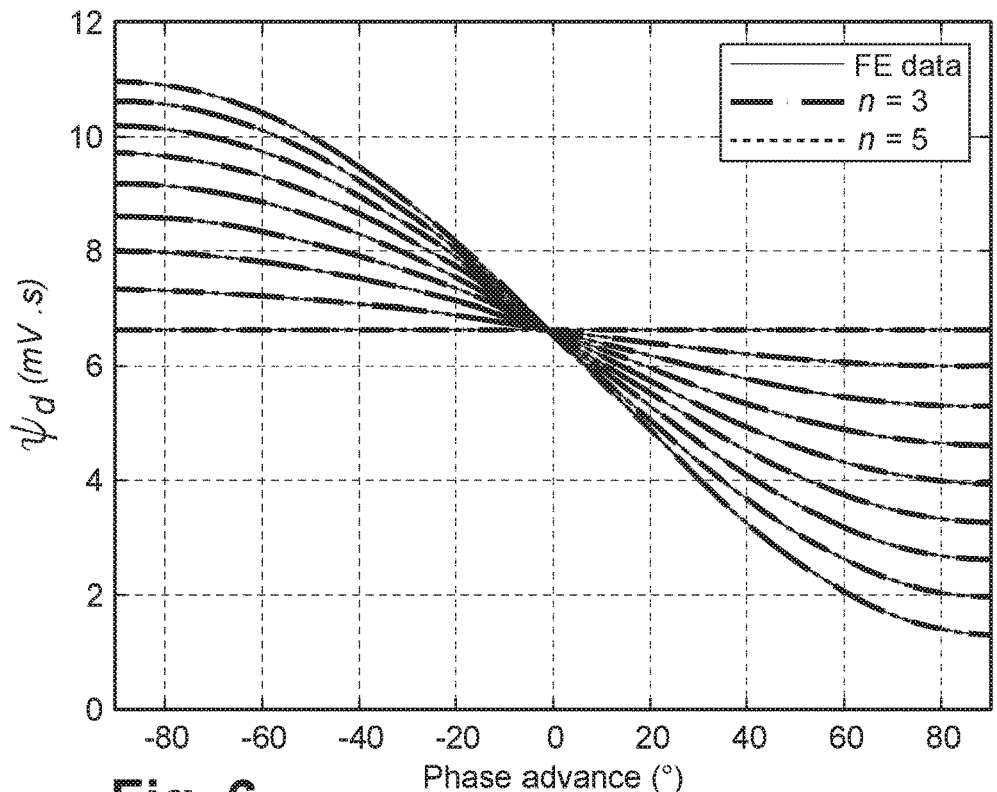
Fig. 6 $\psi_d$ polynominal accuracy
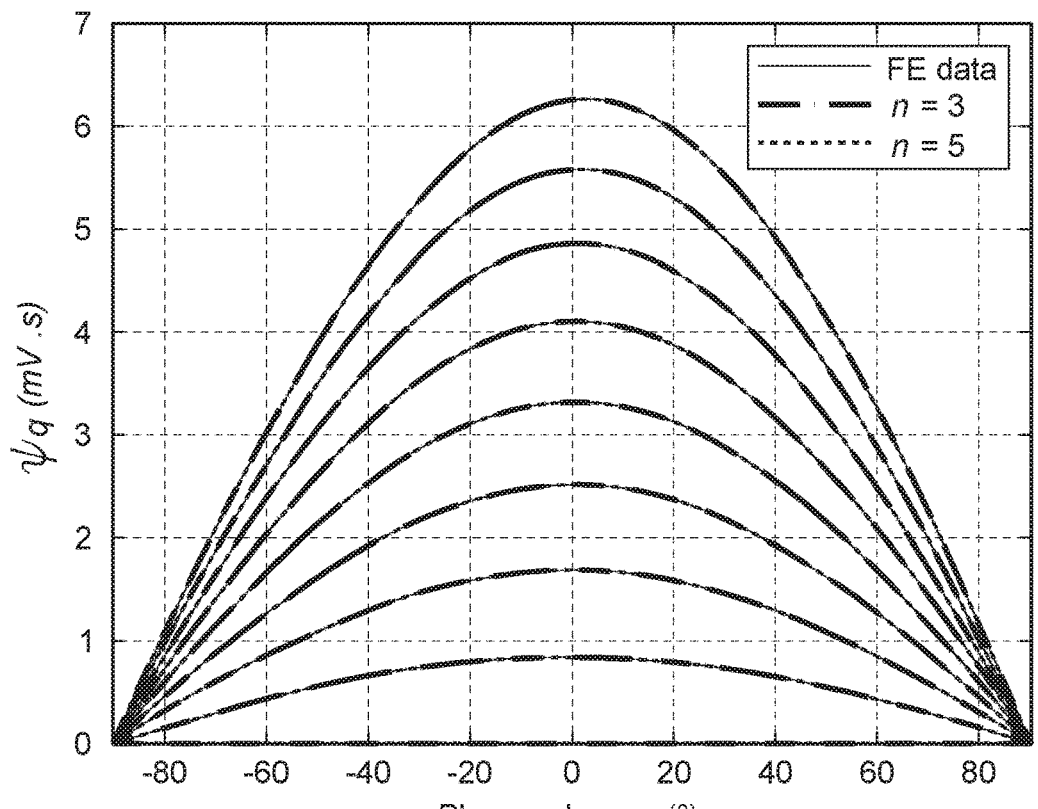
Fig. 7 $\psi_q$ polynominal accuracy Current profile summary (4 current ramps).

Voltage profile summary (4 current ramps).

Torque profile summary (4 current ramps).

METHOD OF CHARACTERISING A SYNCHRONOUS MOTOR

RELATED APPLICATION

This application claims priority from British Application No. 1820001.4, filed Dec. 7, 2018, the subject matter of which is incorporated herein by reference in its entirety.

BACKGROUND OF THE INVENTION

This invention relates to a method of characterizing a permanent magnet synchronous motor by determining a set of parameters that define the motor. Variations of the method of the invention may be used in real time or offline after acquisition of data.

Permanent magnet synchronous motors are well known for use in a wide range of applications. They have proven especially suitable for use in electric power steering systems due to their ability to operate precisely over a wide range of torques as well as being robust and cost effective. In an electric power steering system the motor is driven in response to a torque demand signal to apply a torque to a steering shaft or other part of the steering mechanism that helps the driver to turn the wheel. In a fully steer by wire system, the motor may be the sole means of turning the steered wheels of the vehicle, but generally it will apply a torque alongside a driver applied torque.

For online parameter estimation it is important to have a detailed characterization of the motor parameters that are not changing, or that are being used as starting values for the estimation. Accurate control of the motor in a range of conditions requires good knowledge of the motor parameters. In a simple, widely used, linear model of the motor the q axis and d axis inductances may be defined as constant values. The currents in the d- and q-axes are related to the d- and q-axis voltages using the following relationships:

$$u_d = I_d R_s - w_r L_q I_q + L_d \frac{di_d}{dt} \quad (1)$$

$$u_q = I_q R_s + w_r L_d I_d + w_r \psi_m + L_q \frac{di_q}{dt} \quad (2)$$

Where the letters with the suffixes d or q represent quantities in the d-q frame such as voltage (u), current (i) and inductances (L). $R_s$ is the winding resistance, $w_r$ is the electrical velocity and $\psi_m$ the permanent magnet flux-linkage.

This classical model is robust but the applicant has appreciated that is over simplistic because it ignores the effects of magnetic saturation and cross coupling. When modelling permanent magnet synchronous machines magnetic saturation and cross-coupling effects gain relevance when accuracy is needed. Identification of these parameters becomes a challenging task.

SUMMARY OF THE INVENTION

An object of the present invention is to provide an improved method to identify the parameters of the model of a motor.

According to a first aspect the invention provides a method suitable for characterizing a motor, such as a permanent magnet synchronous motor, comprising the steps of:

Obtaining a plurality of winding flux linkage values or terminal voltages of the motor, each corresponding to a different combination of phase current magnitude and phase advance, Transforming the resultant flux-linkage values or terminal voltages into the rotor dq reference frame, Fitting the flux linkage model to the one or more dq-axis flux-linkage values or terminal voltages and their linked phase current magnitude and phase advance using a process of parametric optimisation.

The method may use a flux linkage model that includes the effects of saturation for the fitting of the values.

In particular, the method may use a flux linkage model that includes the effects of cross-coupling between d- and q-axes instead of, or in addition to, the effects of saturation. Prior art models general are linear models that do not allow for these effects, making them unsuitable for applications were accurate determination of the parameters is required.

In a particularly advantageous arrangement the flux linkage model utilises a power series based upon Taylor's theorem for multivariable functions. This enables the power series to be valid for all infinite differentiable functions.

The parameters determined from the model may include one or more or all of the following parameters:

The method may optimise the model coefficients to determine values for the following parameters of the motor:

magnetic permanent flux-linkage $\psi_m$ winding resistance of the motor cross coupling between d-axis and q-axis fluxes; and dq-inductances The step of obtaining the plurality of winding flux linkage values may comprise obtaining the values through a finite element simulation of the motor.

An electromagnetic finite element simulation of a three phase motor may directly provide the fluxes in the three phases and the invention may then transform these into the dq-frame.

The step of fitting the model to the linked values may comprise a step of using the transformed values to generate at least one map for the d-axis and q-axis flux-linkages, each map grouping together flux linkage values or terminal voltages having a common phase advance, and Fitting the flux linkage model to the one or more dq-axis flux-linkage maps using a process of parametric optimisation.

The step of fitting the model to the flux linkage values or terminal voltages may comprise a step of forming one or more 2D or 3D maps using the flux linkage values or terminal voltages where each map corresponds to a different phase advance or phase current, the model being parameters being selected to give the best fit of the model to each map.

The at least one map may comprise a plot of the dq-fluxes against the dq-current.

In an alternative the map may comprise a plot of the dq-fluxes as a function of both the phase advance and the current magnitude These maps may be used by the method of the invention for the parameter identification.

In an alternative the method may use the dq-voltages as the basis for the maps as these voltages are known to be a function of the flux-linkages:

$$u_d = I_d R_s - w_r \psi_q + \frac{d\psi_d}{dt} \quad (3)$$

$$u_q = I_q R_s + w_r \psi_d + \frac{d\psi_q}{dt} \quad (4)$$

The step of fitting of the model to the map or maps may comprise a quadratic parameterisation process whereby the parameters of the flux-model are determined using a gradient based method to minimize the sum of the square of the squared errors.

The method may fit the coefficients of a power series that represents the d-axis and q-axis flux linkages to the d-axis and q-axis flux-linkage maps. The method may comprise selecting a power of the series according to the required accuracy which must be traded against the number of computations required to determine the parameters. A higher power will provide a higher accuracy but at greater computational cost.

The method may optimise the parameters of a model that comprises two equations for d-axis and q-axis flux linkages respectively of the form:

$$\psi_d(i_d, i_q) = \sum_{m=0}^{P} \sum_{i=0}^{n-2m} l_{dq(i)(2m)} i_d^i i_q^{(2m)} \quad (5)$$

Where $$P = \frac{n - \mathrm{mod}(n, 2)}{2} \,\bigg|\, n \in N_0$$

And $$\psi_q(i_d, i_q) = \sum_{m=0}^{P} \sum_{i=0}^{n-(2m+1)} l_{qd(2m+1)(i)} i_q^{(2m+1)} i_d^i \quad (6)$$

where, $$P = \frac{(n-1) - \mathrm{mod}((n-1), 2)}{2} \,\bigg|\, n \in N^+$$

Where n is the model order, $l_{dq_{00}}$ is the permanent flux-linkage ($\psi_m$), $l_{dq_{10}}$ and $l_{qd_{10}}$ are the linear dq-inductances used in the classical dq model and the remaining coefficients correspond to the saturation and cross-coupling terms.

The method may optimise the model coefficients to determine values for the following parameters of the motor:
magnetic permanent flux-linkage $\psi_m$
the stator phase winding resistance of the motor
cross coupling between d-axis and q-axis fluxes; and
dq-inductances The plurality of flux linkage values may be obtained by the method by measurement of the flux linkage values directly, by measuring operational parameters from which the flux linkage values can be calculated or which are known to be a function of the flux linkage values, or by finite element modelling of the motor. The method may use a combination of these three alternatives.

Where FE modelling is used the step of obtaining a plurality of winding flux linkage values may comprise obtaining operational values from which the flux linkage values can be derived, the operational values including one or more of the following:
The motor phase currents, meaning the current flowing in each phase of the motor;
The rotor angular position; and
The flux-linkage in each phase of the motor.

Computer software using finite element methods is readily available to solve Maxwell's equations. Those skilled in the use of such software define the mechanical geometry of the motor being analysed, assign appropriate magnetic permeability to the materials using values taken from data sheets or measurement, assign the remanence and demagnetisation characteristic to any permanent magnet materials present in the motor again using values taken from data sheet or measurement, define the electrical conductivity of any materials, and define the number of turns and location of windings present within the motor. These finite element models can be in either two or three dimensions. Three dimensional problems take longer to solve, but yield more accurate results as end effects are accounted for. Depending upon the software being used, the rotor can be set to rotate whilst the currents within the windings are varied, or the currents varied whilst the rotor is held in place. The former allows time transient simulations to be utilised that include the effects of eddy currents within electrically conductive materials within the motor. If the effects of eddy currents are known to be low, magnetostatic simulations can be used. In either case, the simulation needs to be conducted for a range of winding currents at different phasing to the back-emf of the motor and at various current amplitudes. The flux linkage is calculated as a post-processing step from the magnetic field solution. Usually the flux linkage values are calculated for each winding, and therefore represent phase quantities. These flux linkage values, along with the phase currents used in the simulation are transformed in to the dq axes using the following equation:

$$\begin{bmatrix} S_d \\ S_q \end{bmatrix} = \frac{2}{3} \begin{bmatrix} \cos(\theta) & \cos(\theta - 120°) & \cos(\theta + 120°) \\ -\sin(\theta) & -\sin(\theta - 120°) & -\sin(\theta + 120°) \end{bmatrix} \quad (7)$$

Where θ represents the electrical angle between the rotor direct axis and the stator phase-a axis. The letter S represents the quantity to be transformed, such as flux-linkages, phase currents or phase voltages.

It should be noted that whilst finite element analysis provides a ready approach to obtaining the flux linkages, other more traditional approaches using magnetic equivalent circuits could be utilised. Although quicker to compute their accuracy is far lower than the finite element method.

The method may involve finite element simulations at rotor mechanical positions corresponding to every 10 degrees electrically. The choice of the number of simulations being dependent upon accuracy and time available. To characterise a motor over a wide operating range, those skilled in the art appreciate the need to repeat the simulations for a range of phase current amplitudes.

Having obtained the d- and q-axis currents, rotor position, and corresponding flux linkages the flux model coefficients may be optimized using the quadratic parameterisation to fit the flux linkage curves obtained from the operational values.

In one implementation of the method, the objective function for the optimization may be the sum of the squared errors of the dq-axes flux linkages.

Where the operational values are modelled by finite element analysis, rather than real measured values, the optimisation of the model parameters may be performed individually using the following functions where the letters with a hat notation represent estimated values and the letters with no hat notation are the finite element values of the simulation.

$$f_d(x_d) = \sum_{k=1}^{N} (\psi_d(i_{d_k}, i_{q_k}) - \psi_d(\widehat{i_{d_k}}, \widehat{i_{q_k}}))^2 \qquad (8)$$

$$f_q(x_q) = \sum_{k=1}^{N} (\psi_q(i_{d_k}, i_{q_k}) - \psi_q(\widehat{i_{d_k}}, \widehat{i_{q_k}}))^2 \qquad (9)$$

The identification of the model parameters that gives minimal least squares error may be implemented using a quadratic parameter modeller within an off the shelf computer program such as MATLAB.

A further object of the present invention is to provide an improved method to identify the parameters of the model of a motor in a laboratory or other non-operational, offline, setting using actual measurements.

In embodiments of the method where actual measurements are made rather than FE modelling the step of obtaining a plurality of winding flux linkage values may comprise obtaining operational values from which the flux linkage values can be derived, the operational values including one or more of the following:

The motor phase voltages, meaning the voltage applied to each phase of the motor;
The motor phase currents, meaning the current flowing in each phase of the motor;
The rotor angular position.

The method may comprise processing the one or more measurements to derive flux linkage values to which the model can be fitted. These can be grouped together in sets, each set corresponding to a respective phase current and phase advance.

Where possible the measurements may include direct measurement of the flux-linkage in each phase of the motor. This may be obtained from a search coil associated with each phase that is sensitive to the flux linkage.

Further operational values that may be obtained by the method that uses measured data may include one or more of the following:

The motor phase voltages, meaning the voltage applied to each phase of the motor;
The motor phase currents, meaning the current flowing in each phase of the motor;
The rotor angular position; and
The motor torque.

Each of the obtained operational values may comprise real measured values, for instance obtained with the motor in use or in a laboratory.

In one implementation, referred to hereinafter as an offline method, the method may comprise collecting at least some of the operational values, or directly measuring the flux linkage, when the motor is offline, for example in a laboratory setting by applying a set of current ramps to the motor, with each ramp generating one of the set of operational values or flux linkage values and each ramp corresponding to a different phase advance angle of the motor currents.

For example, a current ramp may be applied at two, or three or four or more phase advance angles, e/g 0 degrees, 22.5 degrees, 45 degrees, and 70 degrees. Measurements may be taken periodically within the ramp to build up a set of operational parameters and/or flux linkage measurements at differing current values in each ramp. Each set may be used to generate a respective map that may be used during the model fitting process.

The offline method may comprise driving the motor with ramped currents of short duration. As the current is varied the rotor may be rotating under the control of an external drive, such as that contained within a dynamometer. The speed selected for the test may be below the base speed of the machine. Selection of the duration of the current ramps is influenced by the size of the machine, and the control system maintaining the rotor speed. For example, for a motor of around 1 hp rating, a current setting of 3 or 4 seconds may be appropriate. Keeping the ramps short ensures the duration of the whole measurement method is kept short which is advantageous as it is known that some of the motor parameters are temperature dependent. If the method takes too long the temperature of parts of the motor may have changed making the results inaccurate.

Once all samples have been taken, the method may process them all together to fit to the model, or may use them to form maps as explained above which can be fitted to the model.

The parameter identification using measured data may be based on measurements of the rotor reference frame voltages (dq-voltages) of the machine. To find the optimal coefficients, the sum of the squared errors of the normalized dq-voltages and normalized electric torque are minimized.

Consequently the equation below may be used in place of equations (8) and (9) in the numerical optimization to find the optimal set of parameters describing the motor. As with the optimization using simulated data, the identification of the model parameters that gives minimises the objective function may be implemented using a quadratic parameter modeller within an off the shelf computer program such as MATLAB.

$$f(x) = \sum_{k=1}^{N} ((u_{d_k} - \widehat{u_{d_k}})^2 + (u_{q_k} - \widehat{u_{q_k}})^2 + (T_{e_k} - \widehat{T_{e_k}})) \qquad (10)$$

Where the letters with a hat notation represent the values of the estimated values and the letters with no hat notation the measured values. The estimated values for voltage and torque are obtained using the following equations:

$$T_e(i_d, i_q) = \frac{3}{2} p(\psi_d(i_d, i_q)i_q - \psi_q(i_d, i_q)i_d) \qquad (11)$$

$$u_d = i_d R_s - w_r \psi_q(i_d, i_q) + \frac{d\psi_d(i_d, i_q)}{dt} \qquad (12)$$

$$u_q = i_q R_s + w_r \psi_d(i_d, i_q) + \frac{d\psi_q(i_d, i_q)}{dt} \qquad (13)$$

p is the number of pole pairs within the motor $w_r$ is the electrical frequency of the rotor in radians per second $i_d$ and $i_q$ are the d- and q-axis currents computed from the motor phase currents based on Clarke & Park transforms t is time in seconds $R_s$ is the stator phase winding resistance $T_e$ is the electromagnetic torque produced by the motor. It is assumed that the mechanical energy lost within the motor is negligible or is otherwise accounted for between where the torque is measured and produced within the air gap of the motor.

ud and uq are the d- and q-axis voltages in the rotor reference frame

Where $\psi_q(i_d, i_q)$ and $\psi_d(i_d, i_q)$ are the flux-model power series equations (5) and (6). Because a flux-linkage measurement on the real motor is quite complicated we opted for the measurement of the dq-voltages as they depend on the dq-fluxes. In order to improve the accuracy of the parameter estimation the applicants found it beneficial to include the torque in the objective function.

In another alternative implementation, rather than Finite element modelling or obtaining operational values when the motor is offline the method may comprise measuring the plurality of motor operational values during use of the motor, in an online operation.

For a practical online operation, the method may obtain measurements of operational values over time. The range of these measured operational values is to a large extent dependent upon what the motor is being called to do in the working application. As a minimum, for each optimization the number of measurements of operational values that needs to be obtained is the same as the number of unknown parameters within the objective function. So for example for a model of order n=3, the following equations apply having 11 unknown parameters, which would therefore require 6 or more measurements each taken at a different operating point i.e. a different rotor positions, phase current magnitude or phasing of the electrical currents with respect to the rotor position.

Therefore depending on the number of unknown parameters in the model the method may comprise collecting a minimum of measurements of operational values that meet certain conditions to run the optimization. It is not only about the number of the measurements, the measurements need to be representative, for example a minimum current value or that the measurements cover different operational points.

For example, for an online estimation, the voltage equations in steady state for model order n=3 would take the following form:

$$u_d = R_s i_d - \omega_r(l_{qd10} i_q + l_{qd11} i_q i_d + l_{qd30} i_q^3 + l_{qd12} i_q i_d^2) + \quad (14)$$
$$(l_{dq10} + 2l_{dq20} i_d + l_{dq12} i_q^2 + 3l_{dq30} i_d^2)\frac{di_d}{dt} +$$
$$(2l_{dq02} i_q + 2l_{dq12} i_q i_d)\frac{di_q}{dt}$$

$$u_q = \quad (15)$$
$$R_s i_q + w_r \psi_m + \omega_r(l_{dq10} i_d + l_{dq02} i_q^2 + l_{dq20} i_d^2 + l_{dq12} i_d i_q^2 + l_{dq30} i_d^3) +$$
$$\omega_r(\psi_m + l_{dq02} i_q^2) + (l_{qd11} i_q + 2l_{qd12} i_q i_d)\frac{di_d}{dt} +$$
$$(l_{qd10} + l_{qd11} i_d + 3l_{qd30} i_q^2 + l_{qd12} i_d^2)\frac{di_q}{dt}$$

Several scenarios can be possible. If all the flux-linkage coefficients or parameters (represented by the letter l) are determined in a previously performed offline procedure or are somehow known, the only unknown parameters would be $R_s$ and $\psi_m$. In this case, the two dq-voltage equations are enough to find the two unknown parameters, the coefficient matrix would be of full rank, meaning that there is a unique solution for the problem. Therefore, with the measurements of one operational point is possible to make a valid estimation of $R_s$ and $\psi_m$.

Each operational point delivers a d-axis and a q-axis voltage with its corresponding dq-axis currents and angular velocity. If there are 4 unknown parameters, it would be necessary to obtain two sets of different operational points to form a system of 4 equations with 4 unknown parameters.

Once an initial set of operational values have been obtained to minimise the objective function, further operational values can be used in place of the oldest in subsequent iterations of the characterisation. The only requirement is that the number of unique operational values used within computation of the objective function is at least as high as the number of parameters that are being identified.

The applicant has appreciated that the collection of sufficient operational values when the motor is online may take a relatively long time, during which the temperature of parts of the motor may have varied.

Therefore, in a refinement the method may comprise applying a thermal model of the motor to the operational measurements when fitting to the motor model to at least partially account for the temperature of parts of the motor. Two parameters of the model showing greater sensitivity to temperature are the winding resistance and flux produced by any permanent magnets present in the motor. It is known that the resistivity of copper from which many motor windings are made varies with temperature. Similarly for magnets manufactured from neodymium iron and boron (NdFeB) their remanent flux density is known to reduce at a rate of approximately 0.11% per degree Celcius. Taking just these two variations with temperature, the online equations for a model according to the present invention of order 3 become:

$$u_d = tempco_{copper}(T_{winding} - T_0)R_s i_d - \quad (16)$$
$$\omega_r(l_{qd10} i_q + l_{qd11} i_q i_d + l_{qd30} i_q^3 + l_{qd12} i_q i_d^2) +$$
$$(l_{dq10} + 2l_{dq20} i_d + l_{dq12} i_q^2 + 3l_{dq30} i_d^2)\frac{di_d}{dt} +$$
$$(2l_{dq02} i_q + 2l_{dq12} i_q i_d)\frac{di_q}{dt}$$

$$u_q = \quad (17)$$
$$tempco_{copper}(T_{winding} - T_0)R_s i_q + tempco_{magnet}(T_{magnet} - T_0)\psi_m \omega_r +$$
$$\omega_r(l_{dq10} i_d + l_{dq02} i_q^2 + l_{dq20} i_d^2 + l_{dq12} i_d i_q^2 + l_{dq30} i_d^3) +$$
$$\omega_r(\psi_m + l_{dq02} i_q^2) + (l_{qd11} i_q + 2l_{qd12} i_q i_d)\frac{di_d}{dt} +$$
$$(l_{qd10} + l_{qd11} i_d + 3l_{qd30} i_q^2 + l_{qd12} i_d^2)\frac{di_q}{dt}$$

Through reviewing the above equations, it can be seen that there are now additional parameters, Tmagnet and Twinding for the magnet and winding temperatures respectively to be identified as part of the optimization. $T_o$ is a known constant reference temperature and $tempco_{copper}$ and $tempco_{magnet}$ are temperature coefficients of copper and magnet material.

The permeability of electrical steels used within motors is also known to vary with mechanical stress such as may result from thermal expansion at different rates of dissimilar materials used within a motor. A variation in the permeability of the electrical steel carrying magnetic flux linking with the windings may be observable through a variation in the inductance parameters of the characterised model.

In this fully online method, the data is gathered over time as the motor runs rather than gathering quickly offline using ramps, or by simulation.

In operational situations where less than maximum torque is demanded from the method may comprise adjusting the input current, for example to put more current on the d-axis without producing more torque. This optional method feature would ebale more unique operational values to be obtained without impacting the operation of the motor and would widen the operating range over which the motor is accurately characterized The applicant further proposes that a mixed offline and online method of characterisation may be used. By online we mean characterising the motor when it is in use. In the case of an electric power steering system, for example, where the motor is used to apply an assistance torque to a part of a steering mechanism to help the driver turn the wheel, online means characterising the motor when it is being used to provide the assistance. Typically this will permit characterisation at any time that the vehicle ignition is switched on and the steering system is live.

In this mixed method the steps may therefore comprise:
Performing steps of the first aspect initially with the motor offline or predicted using simulation from which the parameters of the model are estimated, and during a later online operation of the motor performing the following steps:
Measuring a plurality of sets of operational values of the motor, each set corresponding to a different phase advance angle or phase current,
Transforming the measured values into the rotor dq reference frame
optionally measuring the temperature of the windings or magnets and
Fitting the model coefficients to the measured operational values, whereby the step of fitting the model is constrained using one or more of the parameters, but less than all of the parameters, obtained during the offline measurements.

In a most preferred implementation of the method online the measured operational values may comprise the phase voltages, phase currents and rotor position. These are sufficient to enable the fitting of the model to the measured values to be carried out, with the rotor position enabling the currents and voltages to be transformed into the dq frame of reference as required.

Most advantageously, the steps carried out online for the optimisation of the parameters of the model is constrained using predetermined values for the parameters which are known to be relatively independent of temperature.

This allows those parameters that vary relatively a lot with temperature such as motor winding resistance and magnetic flux to be determined online and those which do not such as cross coupling between d-axis and q-axis fluxes and inductance to be determined offline.

Reducing the number of parameters that are determined from the online measurements reduces the amount of computing power needed and may also reduce the time taken to generate usefully accurate values for those online parameters compared with a fully online method. Conversely, compared with a fully offline method the modelling can be more accurate as the effects of temperature can be included in the modelling.

In a further refinement, the method may determine the temperature of parts of the motor such as the magnets and coil windings by inferring the temperature from the variation identified in the motor resistance and magnet flux over time.

The reader will appreciate that the online method can be implemented where the temperature invariant parameters of cross coupling and inductance are obtained by some other means than the method of claim 1, with these parameters being used with the operational values obtained online to optimise the remaining parameters of the model.

Accordingly, in a second aspect the invention provides a method of online characterisation of a permanent magnet synchronous motor comprising the steps of:
Measuring a plurality of operational values of the motor, each set corresponding to a different phase advance angle or phase current magnitude,
Transforming the measured values into the rotor dq reference frame; and
Fitting the transformed operational values to a model of the motor characteristics to determine one or more temperature dependent parameters of the model, whereby the step of fitting to the model is constrained using one or more known temperature invariant parameters.

The measured values may be any of the values set out in the description of the first aspect of the invention. The skilled person will understand that any of the method steps described in relation to the first aspect may be incorporated into the method of the second aspect within the scope of this disclosure.

The known temperature invariant parameters may comprise the flux cross coupling between d and q axes and the motor inductance.

The method of the second aspect may use the model described for the first aspect of the invention, although the model may be simplified taking account that some parameters are known or assumed in this online method. The model may therefore comprise a flux linkage model of the motor that utilises a power series based upon Taylor's theorem for multivariable functions.

This will allow the temperature of the windings and magnet or other parts of the motor to be measured accurately without additional sensors.

The motor torque can be estimated making use of the torque equation (11) as a function of the flux-linkage model presented in 5) and (6). The coefficients in (5) and (6) may be determined using prior to running the method of this second aspect, for example using the offline method of the first aspect, leaving the permanent flux-linkage and its temperature dependency to be estimated online.

According to a further aspect the invention provides a motor modelling apparatus comprising a processor, a memory and a set of programme instructions stored in the memory which when executed by the processor cause the apparatus to carry out a method according to the first aspect of the invention suitable for characterising the performance and parameters of permanent magnet synchronous motors.

The apparatus may be suitable for use after assembly of a motor to determine parameters for use with a controller of the motor when operating the motor or for promulgation to recipients of the motor.

In a refinement the programme instructions may be located remote from the processor and the memory and the apparatus includes communication means for access of the instructions by the processor across a network such as the World Wide Web.

The method of the above aspects, and the apparatus, may be arranged to generate from the characterisation a motor parameter list and the method may store the list in a suitable form for use during subsequent operation of the motor. This may be stored as a printed list or in an electronic memory. If the method is carried out at the end of line of the motor production, then it would be expected that the parameters would not change during installation of the motor and may be used by an operator or purchaser of the motor when setting up a motor controller for the motor.

BRIEF DESCRIPTION OF THE DRAWINGS

There will now be described by way of example only, three embodiments of the method of the present invention with reference to and as illustrated in the accompanying drawings of which:

FIG. 6 are plots of the d axis flux linkage for different phase advance and d axis current magnitudes;

FIG. 7. are plots of the q axis flux linkage for different phase advance and q axis current magnitudes;

DESCRIPTION

To understand the operation of the method of the invention it is first necessary to understand the underlying novel general flux based dq-axis model for permanent magnet synchronous motors, PMSMs, that includes saturation and cross-coupling effects. The model's order is extendable and this order determines how accurate these effects are represented.

The method of the invention employs this novel general machine flux based model developed by the inventors which has a polynomial form. The model is derived in an analytical way to keep it general and applicable to any permanent magnet synchronous machine. Using the model, the method obtains various motor operational values and from these generates a set of data which can be fitted to the model. As will be explained, the preferred method employs quadratic programming to optimise the parameters of the model from the measured operational values. As the model is a flux based model, the operational data is used to generate flux linkage or motor terminal voltages for use in the optimisation.

It is known from the literature that the phase voltages of a permanent magnet synchronous machine can be described either in terms of flux linkages or inductances. The rotor reference frame voltage equations are defined in the following expressions:

$$\begin{bmatrix} u_d \\ u_q \end{bmatrix} = R_s \begin{bmatrix} i_d \\ i_q \end{bmatrix} + \omega_r \begin{bmatrix} -\psi_q(i_d, i_q) \\ \psi_d(i_d, i_q) \end{bmatrix} + \begin{bmatrix} -\dot{\psi}_d(i_d, i_q) \\ \dot{\psi}_q(i_d, i_q) \end{bmatrix} \quad (18)$$

$$\begin{bmatrix} \dot{\psi}_d(i_d, i_q) \\ \dot{\psi}_q(i_d, i_q) \end{bmatrix} = \begin{bmatrix} L_{dd_{diff}}(i_d, i_q) & L_{dq_{diff}}(i_d, i_q) \\ L_{qd_{diff}}(i_d, i_q) & L_{qq_{diff}}(i_d, i_q) \end{bmatrix} \begin{bmatrix} \dot{i}_d \\ \dot{i}_q \end{bmatrix} \quad (19)$$

$$\begin{bmatrix} \psi_d(i_d, i_q) \\ \psi_q(i_d, i_q) \end{bmatrix} = \begin{bmatrix} L_{dd}(i_d, i_q) & L_{dq}(i_d, i_q) \\ L_{qd}(i_d, i_q) & L_{qq}(i_d, i_q) \end{bmatrix} \begin{bmatrix} i_d \\ i_q \end{bmatrix} \quad (20)$$

Figure 1:
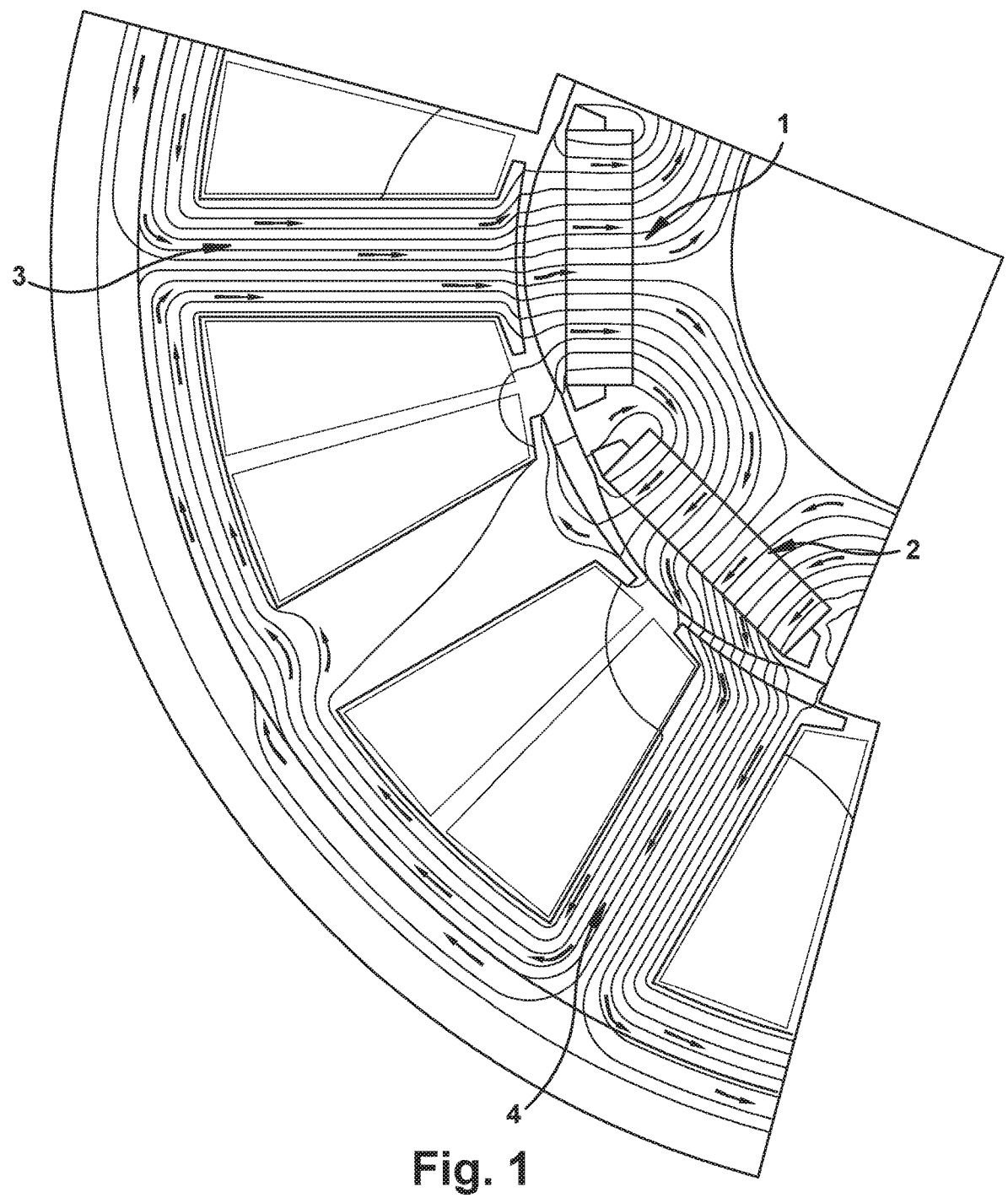
FIG. 1 is a view of a cross section of a part of an interior permanent magnet motor showing the resulting flux in the motor for a d axis current id=0 A and a q axis current iq=40 A.

Permanent magnet synchronous motors are susceptible to magnetic saturation which is caused by the reduction of the relative permeability in the magnetic materials. The resultant relative permeability is determined by the flux density in different material regions, making the magnetic circuit nonlinear. The flux density plot in FIG. 1 illustrates the distribution of the flux density in a portion of a typical interior permanent magnet synchronous machine (IPMSM). Shown in the Figure are two motor magnets 1,2 and three poles 3,4. Due to the relative positions of the magnets and poles the flux can be seen (indicated by the arrowed lines) to flow around a path including the two magnets and two of the poles.

Figure 2:
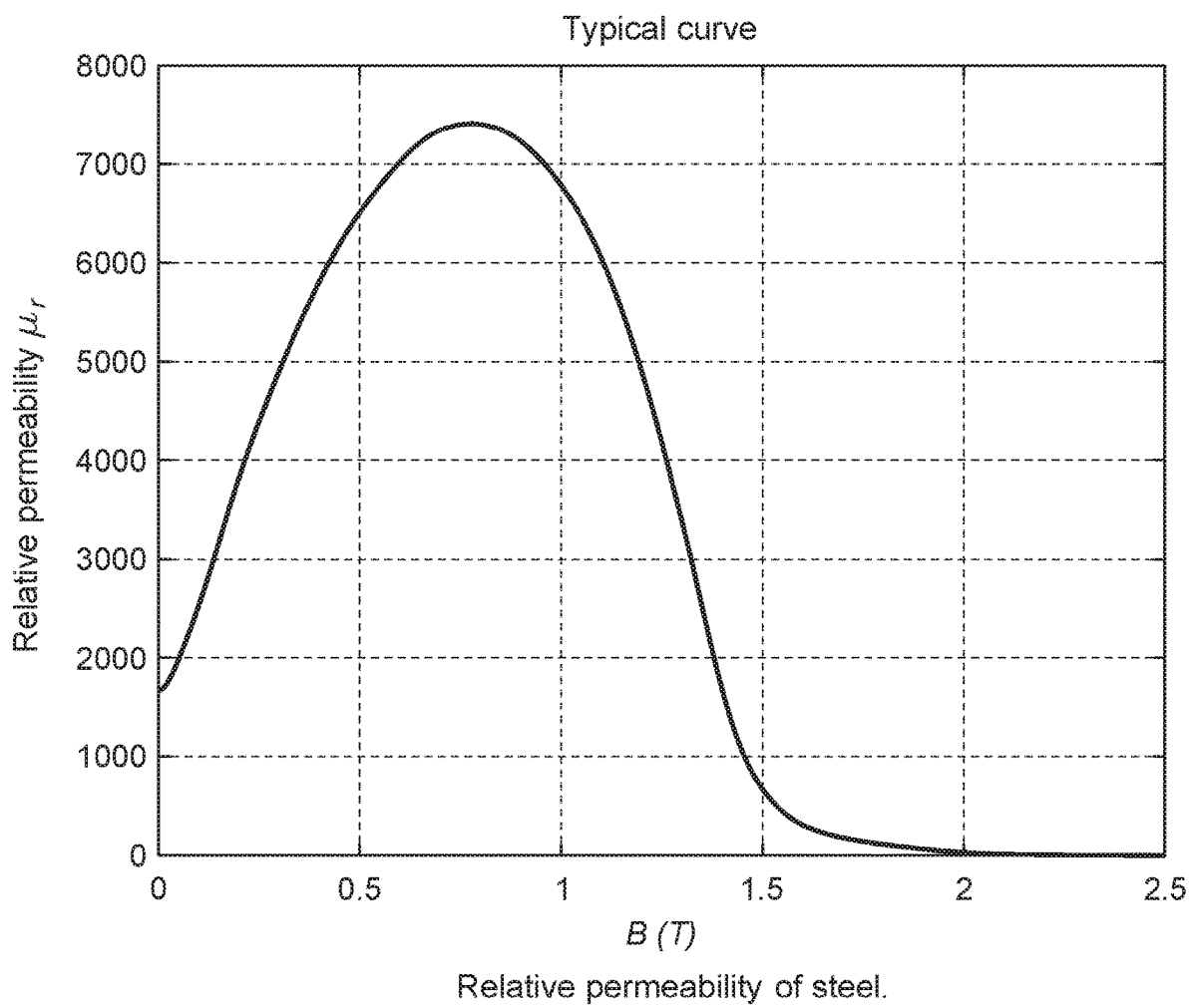
FIG. 2. is a plot showing the relative permeability of steel.

It can be observed that the permeability of the materials along the magnetic path defines the magnetic reluctance R. At the same time the relative permeability_r is determined by the flux density B as shown in FIG. 2 for a typical steel.

$$R = \frac{l}{\mu_0 \mu_r A}; \phi = BA \quad (21)$$

Because the flux flowing through each reluctance is directly related to the flux density, the nonlinear magnetic circuit of a permanent magnet synchronous machine consist of a series of variable reluctances, that depend on their own magnetic flux.

Figure 3:
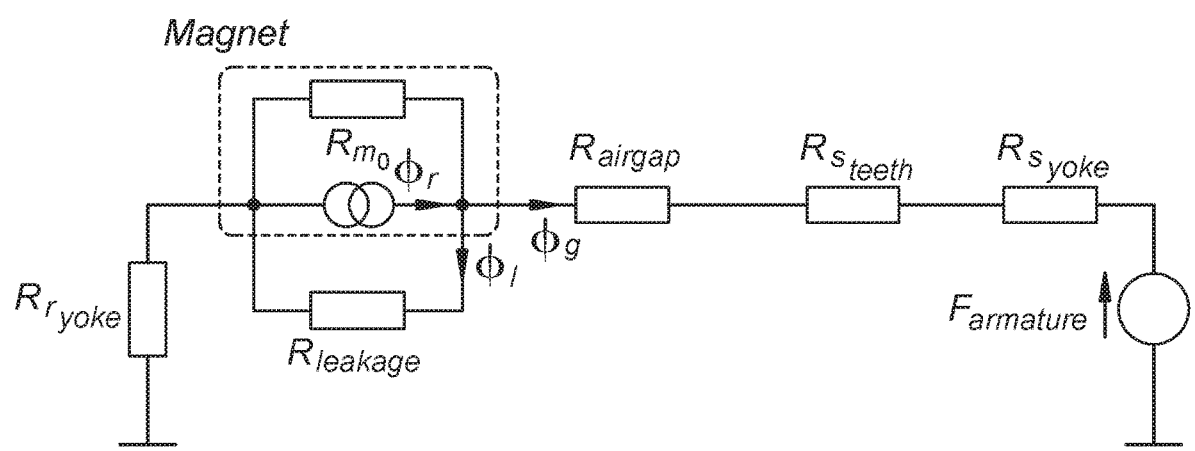
FIG. 3 is a One pole magnetic equivalent circuit of an interior permanent magnet motor.

The fluxes along the magnetic paths are affected by the magnet remnant flux and armature magnetomotive force (m.m.f.). Due to the interactions already mentioned, the magnetic sources are coupled through reluctances. The airgap flux can be described as summation of the contributions of armature m.m.f and magnet remnant flux. The magnetic circuit in FIG. 3 represents the contribution of one phase m.m.f. and one magnet. The airgap flux_g can then be expressed in terms of reluctances, permanencies, magnet remnant flux_r and armature m.m.f. The flux source term is accompanied by a non-linear factor (Areq) analog to a current divider factor in circuit theory. The m.m.f sources are multiplied by equivalent permeances $$\left(Pa_{1_{eq}}, Pa_{2_{eq}}, Pa_{3_{eq}}\right)$$

to obtain flux, which is analog to admittance. However this model can be extended to consider the effects of the other two phases in a general form as in equation (22).

$$\phi_g = A_{req}(\phi_r, F_{a_1}, F_{a_2}, F_{a_3})\phi_r + Pa_{1_{eq}}(\phi_r, F_{a_1}, F_{a_2}, F_{a_3})F_{a_1} + \quad (22)$$
$$Pa_{2_{eq}}(\phi_r, F_{a_1}, F_{a_2}, F_{a_3})F_{a_2} + Pa_{3_{eq}}(\phi_r, F_{a_1}, F_{a_2}, F_{a_3})F_{a_3}$$

In developing a parametric model in the rotor reference frame, the applicant has appreciated that the air-gap flux can be transformed in the following way:

$$\phi_{g_d} = A_{r_{d_{eq}}}(\phi_r, F_d, F_q)\phi_r + P_{a_{d_{eq}}}(\phi_r, F_d, F_d)F_d \quad (23)$$

$$\phi_{g_q} = P_{a_{q_{eq}}}(\phi_r, F_d, F_d)F_q \quad (24)$$

The proportional relationship between armature m.m.f and current; the flux equations (23) and (24) can be expressed in terms of the currents:

$$\phi_{g_d} = K(\phi_r, i_d, i_q)\phi_r + D(\phi_r, i_d, i_q)i_d \quad (25)$$

$$\phi_{g_q} = Q(\phi_r, i_d, i_q)i_q \quad (26)$$

By making use of Taylor's theorem for multi-variable functions, equations (25) and (26) can be expressed in a polynomial form. If the magnet operating point is kept in the linear part of the B—H curve and the magnet temperature remains constant, the magnet remanent flux_r can be assumed to be constant:

$$\phi_{g_d}(i_d, i_q) = \sum_{n=0}^{\infty} \frac{1}{n!}\left[\left(\Delta i_d \frac{\partial}{\partial i_d} + \Delta i_q \frac{\partial}{\partial i_q}\right)^n \phi_{g_d}(i_d, i_q)\right]_{i_{d_0}, i_{q_0}} \quad (27)$$

$$\phi_{g_q}(i_d, i_q) = \sum_{n=0}^{\infty} \frac{1}{n!}\left[\left(\Delta i_d \frac{\partial}{\partial i_d} + \Delta i_q \frac{\partial}{\partial i_q}\right)^n \phi_{g_q}(i_d, i_q)\right]_{i_{d_0}, i_{q_0}} \quad (28)$$

To continue to develop the model as a flux linkage one, it is prudent at this point to switch from magnetic flux expressions to flux linkage expressions. The dq-flux linkages can be expressed in the same way as in equations (27) and (28). The summations can be rewritten in terms of coefficients after evaluating the derivatives at the point (0; 0) and expanding the polynomials:

$$\psi_d(i_d, i_q) = N\phi_{g_d}(i_d, i_q) \quad (29)$$

$$\psi_q(i_d, i_q) = N\phi_{g_q}(i_d, i_q) \quad (30)$$

$$\psi_d(i_d, i_q) =$$
$$l_{dq_{00}} + l_{dq_{01}}i_q + l_{dq_{10}}i_d + l_{dq_{02}}i_q^2 + l_{dq_{11}}i_d i_q + \ldots \psi_q(i_d, i_q) =$$
$$l_{qd_{00}} + l_{qd_{10}}i_q + l_{qd_{01}}i_d + l_{qd_{20}}i_q^2 + l_{qd_{11}}i_q i_d + \ldots$$

$$\psi_d(i_d, i_q) = \sum_{m=0}^{N}\sum_{i=0}^{m} l_{dq(i)(m-i)} i_d^i i_q^{(m-i)} \quad (31)$$

$$\psi_q(i_d, i_q) = \sum_{m=0}^{N}\sum_{i=0}^{m} l_{qd(m-i)(i)} i_q^{(m-i)} i_d^i \quad (32)$$

So far the flux linkage has been expressed according to Taylor's theorem in the form of a power series expansion. Taking into consideration that there is no q-axis permanent magnet flux component that can bias the relative permeability of the q-axis magnetic path and observing equation (26), it is evident that the q-axis flux is an odd function with respect to $i_q$. This means for the q-axis flux linkage the following:

$$\psi_q(i_d, i_q) = -\psi_q(i_d, -i_q)$$

Equation (32) can be simplified because the coefficients of terms with even powers of iq would be zero. Being n the polynomial degree, equation (32) can be rewritten in the form of equation (33).

$$\psi_q(i_d, i_q) = \sum_{m=0}^{P}\sum_{i=0}^{n-(2m+1)} l_{qd(2m+1)(i)} i_q^{(2m+1)} i_d^i \quad (33)$$

where, $$P = \frac{(n-1) - \text{mod}((n-1), 2)}{2} \bigg| n \in N^+$$

For example, for n=3 the coefficients would be:

$$\psi_q(i_d, i_q) = l_{qd_{10}}i_q + l_{qd_{11}}i_q i_d + l_{qd_{30}}i_q^3 + l_{qd_{12}}i_q i_d^2$$

The contribution of $i_d$ in equation (25) indicates that the d axis flux could be symmetric with respect of $i_d$. In reality the d-axis magnetic path is biased by the permanent magnet flux. The relative permeability in this path won't show a symmetric behaviour with respect to $i_d$. This means that there is no simplification for the powers of $i_d$ due to symmetry. On the other hand, the d-axis flux is symmetric with respect to $i_q$:

$$\psi_d(i_d, i_q) = \psi_d(i_d, -i_q)$$

Because $\psi_d(i_d, i_q)$ is an even function with respect to $i_q$, all coefficients of terms with odd powers of $i_q$ would be zero in equation (31). Being n the polynomial degree, equation (31) can be rewritten in the form of equation (34).

$$\psi_q(i_d, i_q) = \sum_{m=0}^{P}\sum_{i=0}^{n-2m} l_{qd(i)(2m)} i_d^i i_q^{(2m)} \quad (34)$$

-continued where $$\psi_d(0, 0) = l_{dq00} = \psi_m$$

$$P = \frac{n - \mathrm{mod}\ (n, 2)}{2} \bigg| n \in N_0$$

For example, for n=3 the coefficients would be:

$$\psi_d(i_d,i_q) = \psi_m + l_{dq10}i_d + l_{dq02}i_q^2 + l_{dq20}i_d^2 + l_{dq12}i_d i_q^2 + l_{dq30}i_d^3$$

The correlation of the coefficients to the physical parameters can be seen in the following equations:

$$L_{d_0} = l_{dq10};\ L_{q_0} = l_{qd10}$$

An inductance-based model can be still derived from the model presented in (33) and (34). The absolute and differential dq-axis inductances can be easily obtained from the polynomials.

Figure 4:
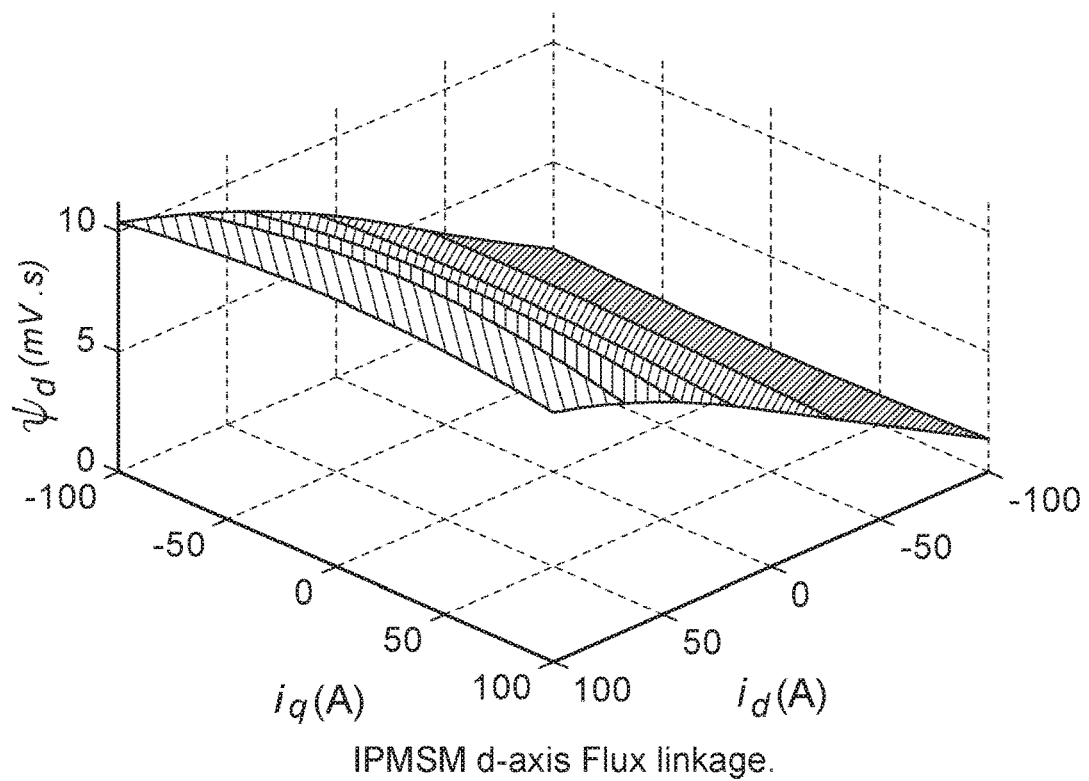
FIG. 4 is a plot showing the flux linkage on the d-axis as a function of Id and Iq computed using finite element analysis.
Figure 5:
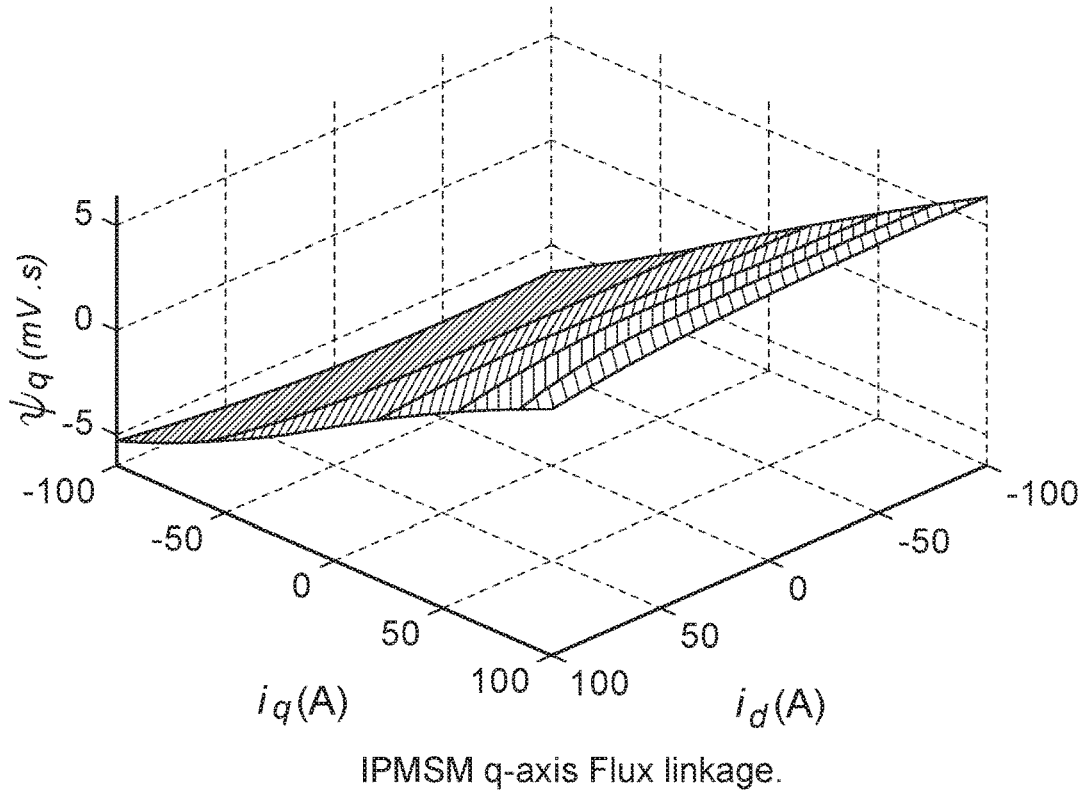
FIG. 5. is a plot showing the flux linkage on the q-axis as a function of Id and Iq computed using finite element analysis.

The coefficients of (33) and (34) can be then determined by means of any optimization method to fit them to the flux linkage curves obtained by the simulation (e.g. FIGS. 4 and 5). The sum of the squared errors of a given objective function can be minimized for that matter. The optimization problem can be formulated as a constrained problem due to physical constraints of the machine, like positive winding resistance, positive permanent flux-linkage, etc. Quadratic programming is chosen because it is a simple constrained optimization problem. If it is defined as an unconstrained problem, it gets reduced to a least squared problem:

$$\mathrm{Minimize}\ Q(x) = \tfrac{1}{2}x^T G x + g^T x \quad (35)$$

Where G is the Hessian $\nabla^2 f(x)$ of the objective function $f(x)$ and $g = \nabla f(x) - Gx$. The objective functions for the dq-axis flux linkages are defined in (36) and (37).

$$f_d(x_d) = \sum_{k=1}^{N} (\psi_d(i_{d_k}, i_{q_k}) - \psi_d(\widetilde{i_{d_k}}, i_{q_k}))^2 \quad (36)$$

$$f_q(x_q) = \sum_{k=1}^{N} (\psi_q(i_{d_k}, i_{q_k}) - \psi_q(\widetilde{i_{d_k}}, i_{q_k}))^2 \quad (37)$$

Where:

$$\widetilde{\psi_d} = \nabla \psi_d x_d;\ \widetilde{\psi_q} = \nabla \psi_q x_q$$

For example, for n=3:

$$x_d^T = [\psi_m\ l_{dq10}\ l_{dq02}\ l_{dq20}\ l_{dq12}\ l_{dq30}]$$

$$x_q^T = [l_{qd10}\ l_{qd11}\ l_{qd30}\ l_{qd12}]$$

$$\nabla \psi_d^T = [1\ i_d\ i_q^2\ i_d^2\ i_d i_q^2\ i_d^3]$$

$$\nabla \psi_q^T = [i_q\ i_q i_d\ i_q^3\ i_q i_d^2]$$

For the purpose of initially validating the method of the present invention the quadratic programming solver "quadprog" of the software MATLAB was used to run the curve fitting process for different model orders. The polynomials feed into the optimization process were in its full form (see equations (31) and (32)) in order to show the correctness of the analysis previously done.

| $\psi_d$ | | |
|---|---|---|
| Idq00 | 6.7 | mV · s |
| Idq10 | 55.9 | μH |
| Idq01 | ≈0 | H |
| Idq20 | −60.9 | nH/A |
| Idq11 | ≈0 | H/A |
| Idq02 | −18.9 | nH/A |
| Idq30 | −0.59 | nH/A$^2$ |
| Idq21 | ≈0 | H/A$^2$ |
| Idq12 | −0.56 | nH/A$^2$ |
| Idq03 | ≈0 | H/A$^2$ |
| $\psi_q$ | | |
| Iqd00 | ≈0 | V · s |
| Iqd10 | 70.1 | μH |
| Iqd01 | ≈0 | H |
| Iqd20 | ≈0 | H/A |
| Iqd11 | −36.6 | nH/A |
| Iqd02 | ≈0 | H/A |
| Iqd30 | −0.55 | nH/A$^2$ |
| Iqd21 | ≈0 | H/A$^2$ |
| Iqd12 | −0.58 | nH/A$^2$ |
| Iqd03 | ≈0 | H/A$^2$ |

TABLE I above shows the model coefficients according to equations (31) and (32) for a particular permanent magnet synchronous motor.

Model Coefficients According to (31) and (32)

The non-zero elements in table I correspond to the coefficients in expressions (16) and (14). The accuracy of different model orders is shown in FIGS. 6 and 7. For that comparison only the relevant coefficients were taken into consideration.

Verification of the Model

Regardless of the type of machine model, either inductance based, or flux based, a general observation has to be made when considering the fidelity level of the target model. If a nonlinear model is required, the equation (34) gives an insight of an important term to be considered. The terms $l_{dq02}i_q^2 + l_{dq04}i_q^4 + \ldots$ could account for a certain torque reduction at high $i_q$ current.

$$T_e(i_d, i_q) = \frac{3}{2} P(\psi_d i_q - \psi_q i_d) \quad (38)$$

$$T_e(0, i_q) = \frac{3}{2} P\left(\psi_m + l_{dq02}i_q^2 + l_{dq04}i_q^4 + \ldots\right) i_q \quad (39)$$

$$K_t = \frac{3}{2} P(\psi_m + l_{dq02}i_q^2 + l_{dq04}i_q^4 + \ldots) \quad (40)$$

Equation (40) describes the torque constant Kt. It is defined as the ratio between the electromagnetic torque, Te and the q-axis current, iq at zero phase advance ($i_d$=0 A). It can be easily measured as it only requires to drive the machine with id=0 A and to record the torque at different q-axis current values.

Figure 8:
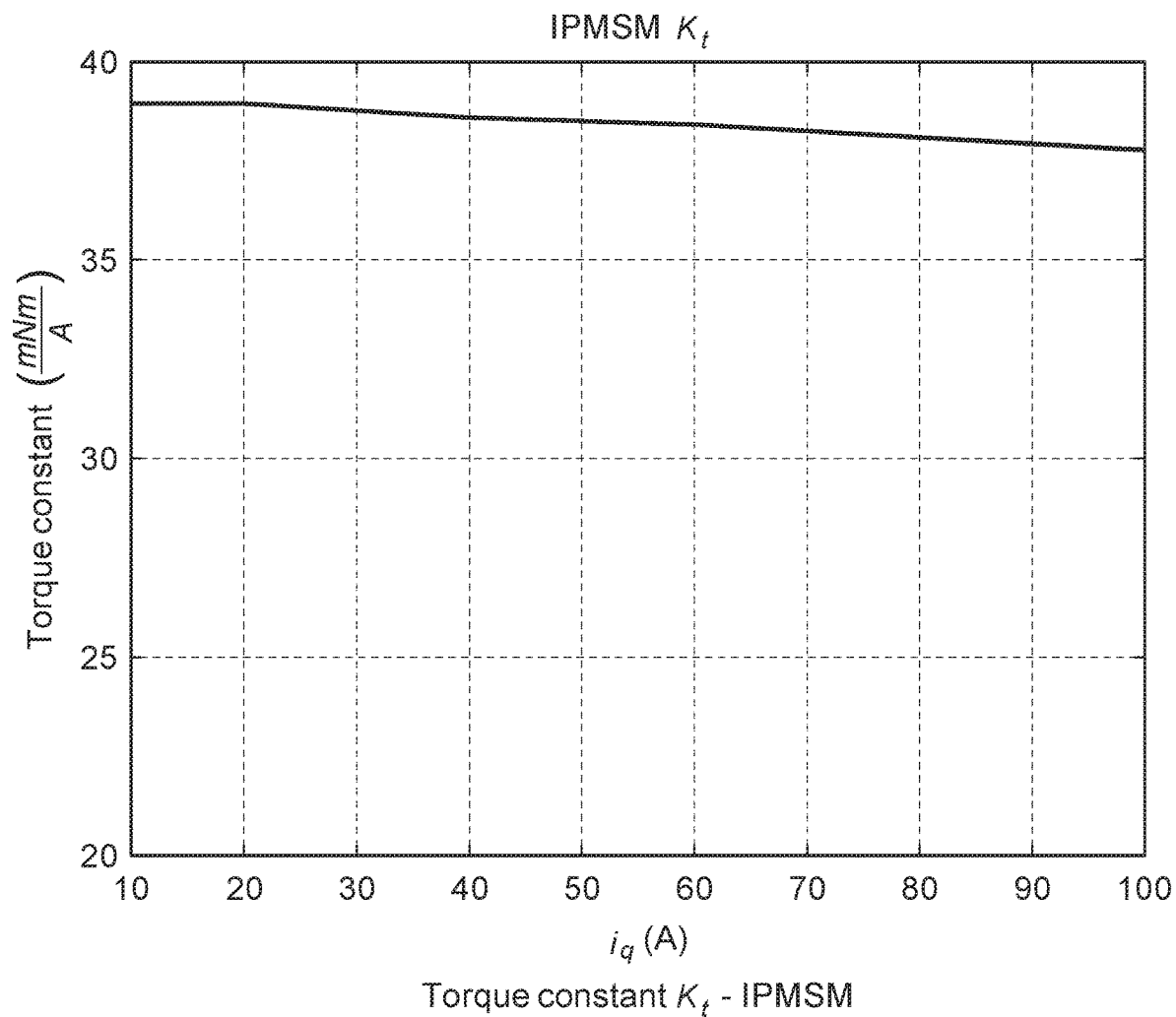
FIG. 8 is a plot showing the relationship between the Torque constant Kt and the q-axis current for an exemplary interior permanent magnet synchronous motor
Figure 9:
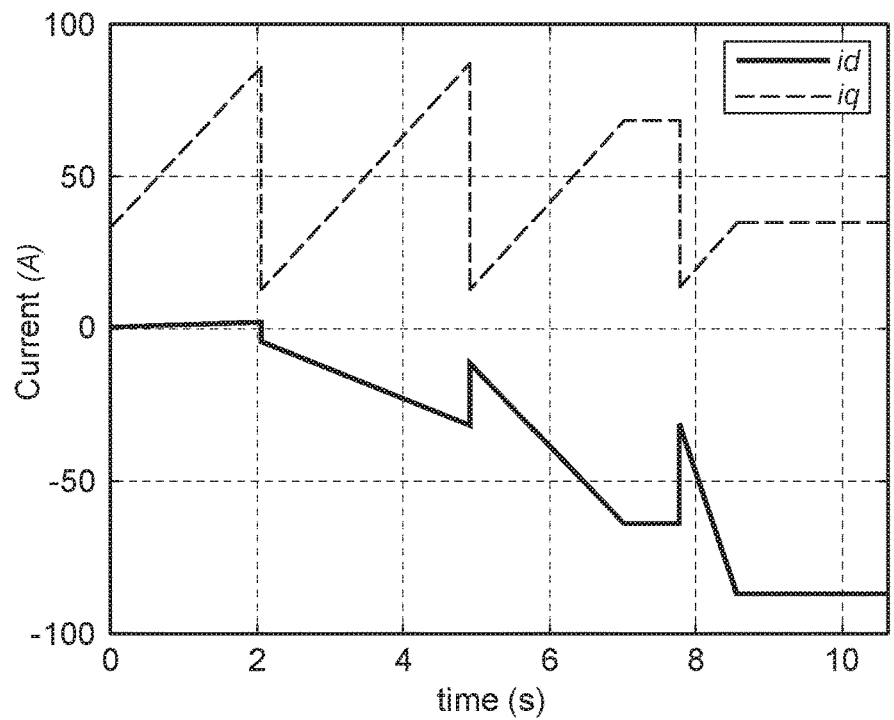
FIG. 9 illustrates a set of phase currents that are obtained when applying four exemplary current ramps.
Figure 10:
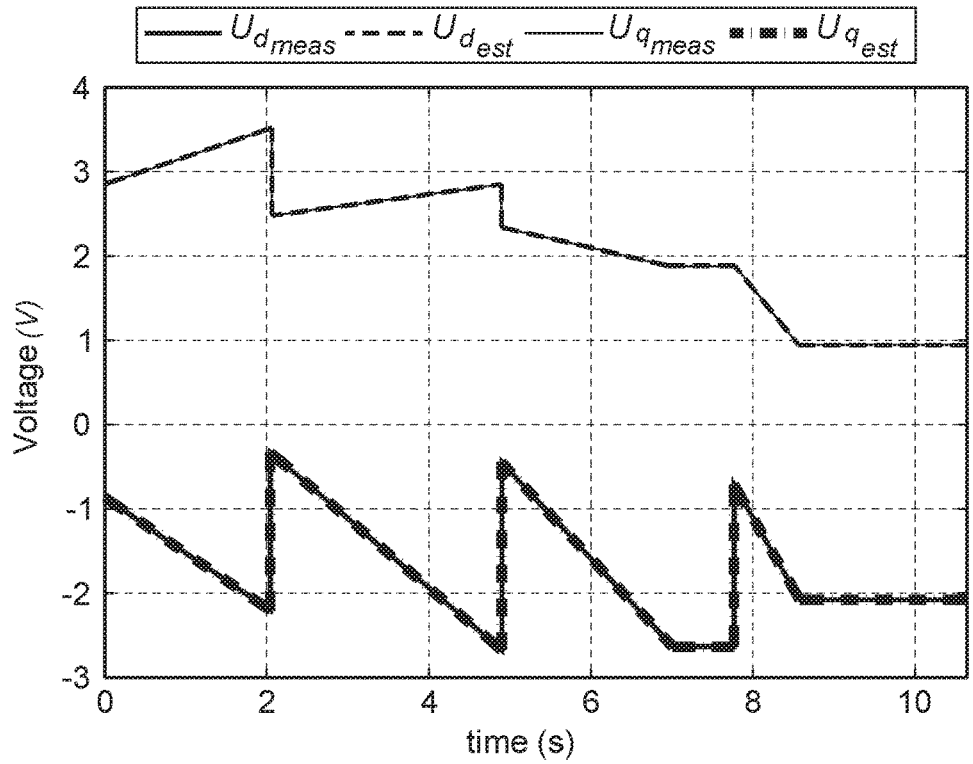
FIG. 10. illustrate as set of phase voltages obtained using the ramps used for FIG. 9.
Figure 11:
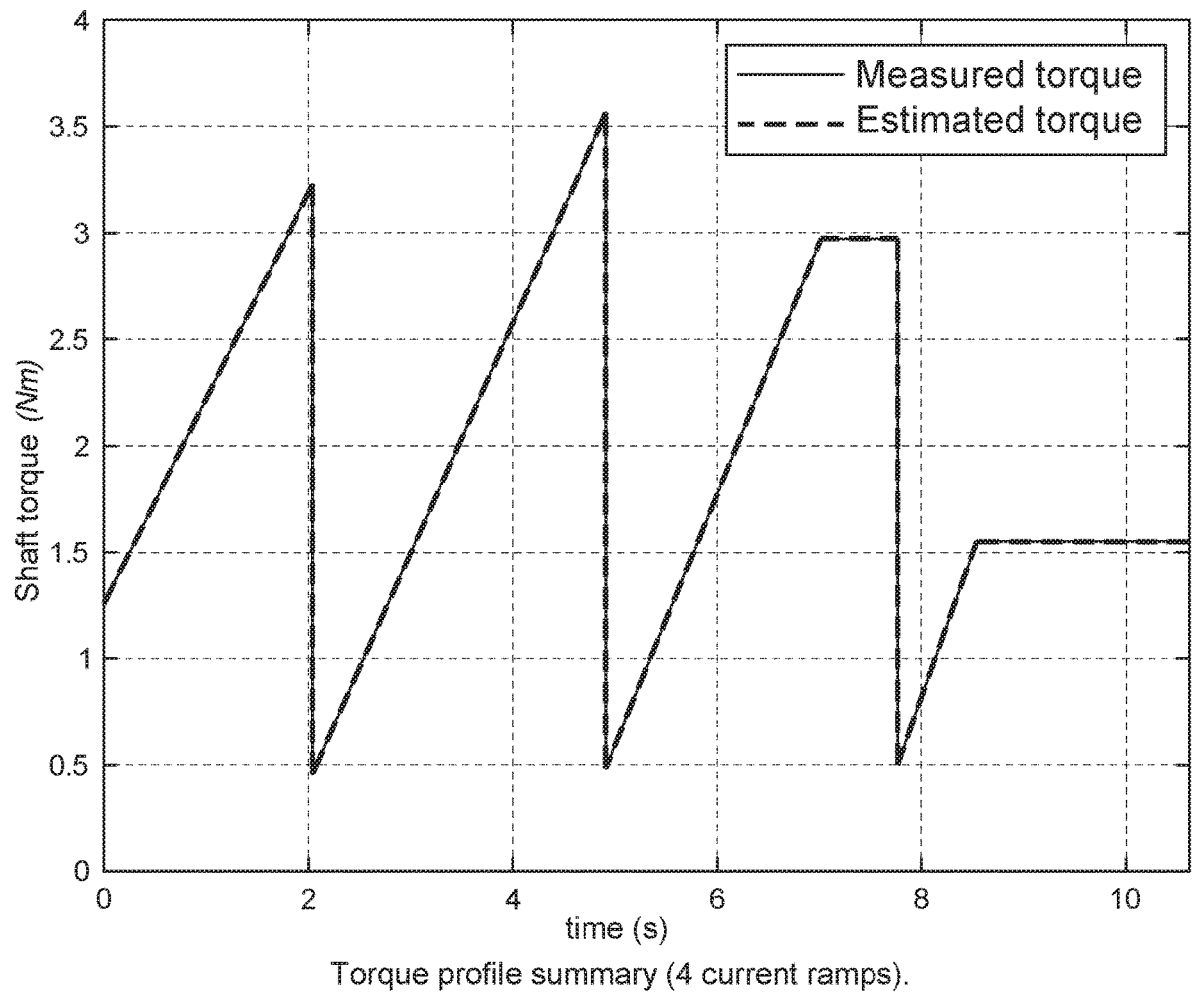
FIG. 11 illustrates a torque profile summary for the ramps used in FIG. 9 showing a good correlation between measured and estimated torque over time.

By characterizing the machine in terms of resistance and self-inductances Ldd(id) and Lqq(iq) alone the reduction in Kt with increasing q-axis current seen in FIG. 8 behaviour can still not be fully described. An inductance based model in the form of (19) and 20) should be considered, where the cross-coupling effects are included or at least Ldq(0; iq)

could be taken into account. In that way additional terms affecting Kt are included in the model (see equation (41)).

$$L_{dq}(0, i_q) = \psi_d(0, i_q) = \sum_{m=1}^{P} l_{dq0(2m)} i_q^{(2m)} \quad (41)$$

where $$P = \frac{n - \mathrm{mod}(n, 2)}{2} \bigg| n \in 2N^+$$

First Exemplary Method—Offline Motor Parameter Measurement Using Finite Element Modelling The method may fit the model to flux linkage values that have been obtained from a finite element (FE) model of the motor. In one exemplary method of this kind the following steps may be performed:

Step 1—Simulate the Flux Linkages using an Electromagnetic Finite Element Solver In a first exemplary method the mechanical dimensions of the motor to be modelled are obtained from drawings, Computer Aided Design models or measurement. Magnetic properties of materials, such as relative permeability and remanence of any magnets used in the motor are obtained from data sheets or measurement. The number of turns of each winding within the motor are also obtained from inspection, drawings or Computer Aided Design models. This design information is entered in to one of the readily available computer programs capable of solving Maxwell's equations. Assuming eddy currents within the materials from which the motor is made are known to have little significance, a magnetostatic solution of Maxwell's equations is selected. Each software has different user interfaces, and there are frequently similar ways of achieving the same analyses. A typical approach will be to configure the computer software to rotate the rotor of the simulated motor through one electrical cycle. For a motor containing 4 pole pairs this will correspond to a quarter of a rotation of the rotor mechanically. The computer software is further configured so at each rotor position selected for analysis a set of currents are applied to the windings. These currents are computed so that the d- and q-axis currents are invariant to rotor position. Having run the simulation, the rotor is then rotated through a further electrical cycle with a different set of d- and q-axis currents that correspond to a different phase advance. The process is then repeated until a range of phase advances have been simulated. The simulation is further repeated for all the phase advances but at a different level of current magnitude. Depending upon the software used, the solved magnetic fields are post-processed either after computation of each individual simulation at a rotor position and phase current combination, or after the whole data set has been simulated. During the post-processing step the computer software is requested to provide the flux linking with coils within the model. The flux linkages are then combined together with reference to the connections of the coils that form each phase of the motor.

Step 2—Transform the Resultant Flux Linkage Values

The flux linkage and phase current values obtained within Step 1 in combination with the rotor position at which each simulation was performed are transformed in to the rotor dq reference frame using equation 7.

Step 3—Fitting the Flux Linkage Model to the Data

Equations 33 and 34 and expanded to the selected model order. For a model of order n=3 this would be as set out above, and the unknowns parameter values to be identified are:

$$x_d^T = [\psi_m l_{dq10} l_{dq02} l_{dq20} l_{dq12} l_{dq30}]$$

$$x_q^T = [l_{qd10} l_{qd11} l_{qd30} l_{qd12}]$$

The flux linkage gradients for each simulated dq current combination are formed in a matrix. The corresponding d- and q-axis currents and the corresponding objective functions of equations 36 and 37 are formed by formulating the quadratic programming problem of equation 35 for each objective function.

For example, for n=3:

$$\nabla \psi_d^T = [\,1 \quad i_d \quad i_q^2 \quad i_d^2 \quad i_d i_q^2 \quad i_d^3\,]$$

$$\nabla \psi_q^T = [\,i_q \quad i_q i_d \quad i_q^3 \quad i_q i_d^2\,]$$

$$\widehat{\psi_d} = \nabla \psi_d^T x_d;\ \widehat{\psi_q} = \nabla \psi_q^T x_q$$

$$f_d(x_d) = \sum_{k=1}^{N} (\psi_d(i_{d_k}, i_{q_k}) - \nabla \overline{\psi_{d_k}^T x_d})^2$$

$$f_q(x_q) = \sum_{k=1}^{N} (\psi_q(i_{d_k}, i_{q_k}) - \nabla \overline{\psi_{q_k}^T x_q})^2$$

Recalling equation 35, the quadratic programming problems $Q_d(x_d)$, $Q_q(x_q)$ are defined through the gradients $\nabla f_d(x_d)$, $\nabla f_q(x_q)$ and the Hessians $\nabla^2 f_d(x_d)$, $\nabla^2 f_q(x_q)$ of the corresponding objective functions. The parameters represented by $x_d$ and $x_q$ are then optimized using a quadratic programming solver with the corresponding gradients and Hessians as inputs.

Figure 12:
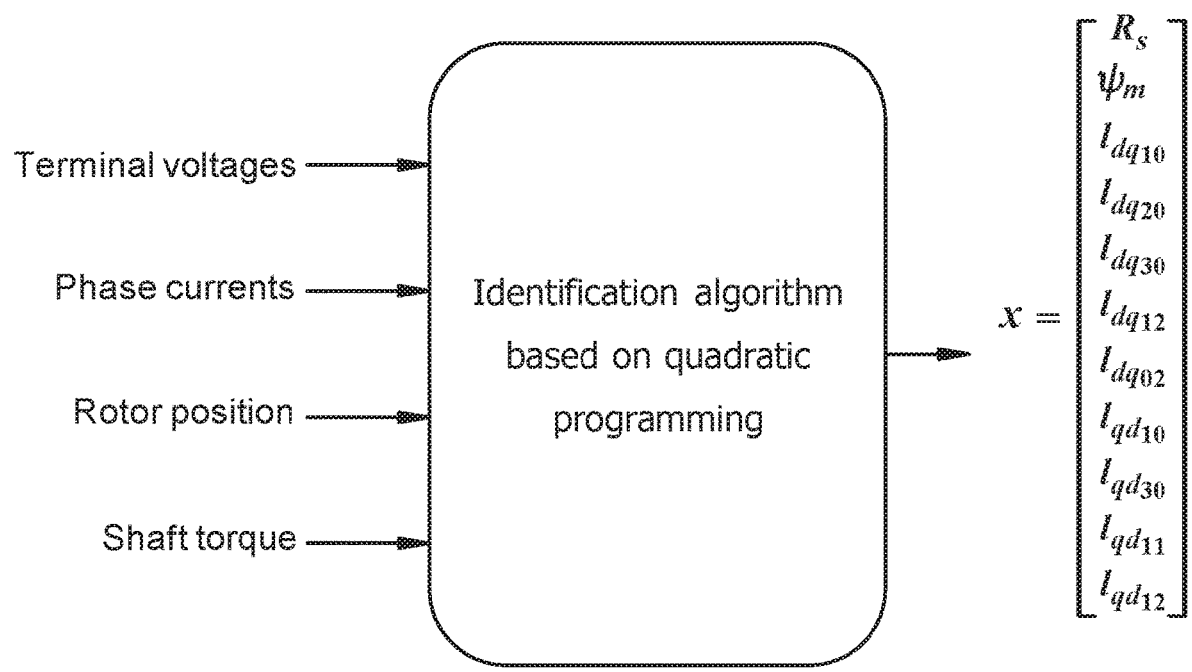
FIG. 12 is a schematic representation of a first embodiment of a method for offline optimisation showing the input operational variables and the list of optimised parameters.
Figure 13:
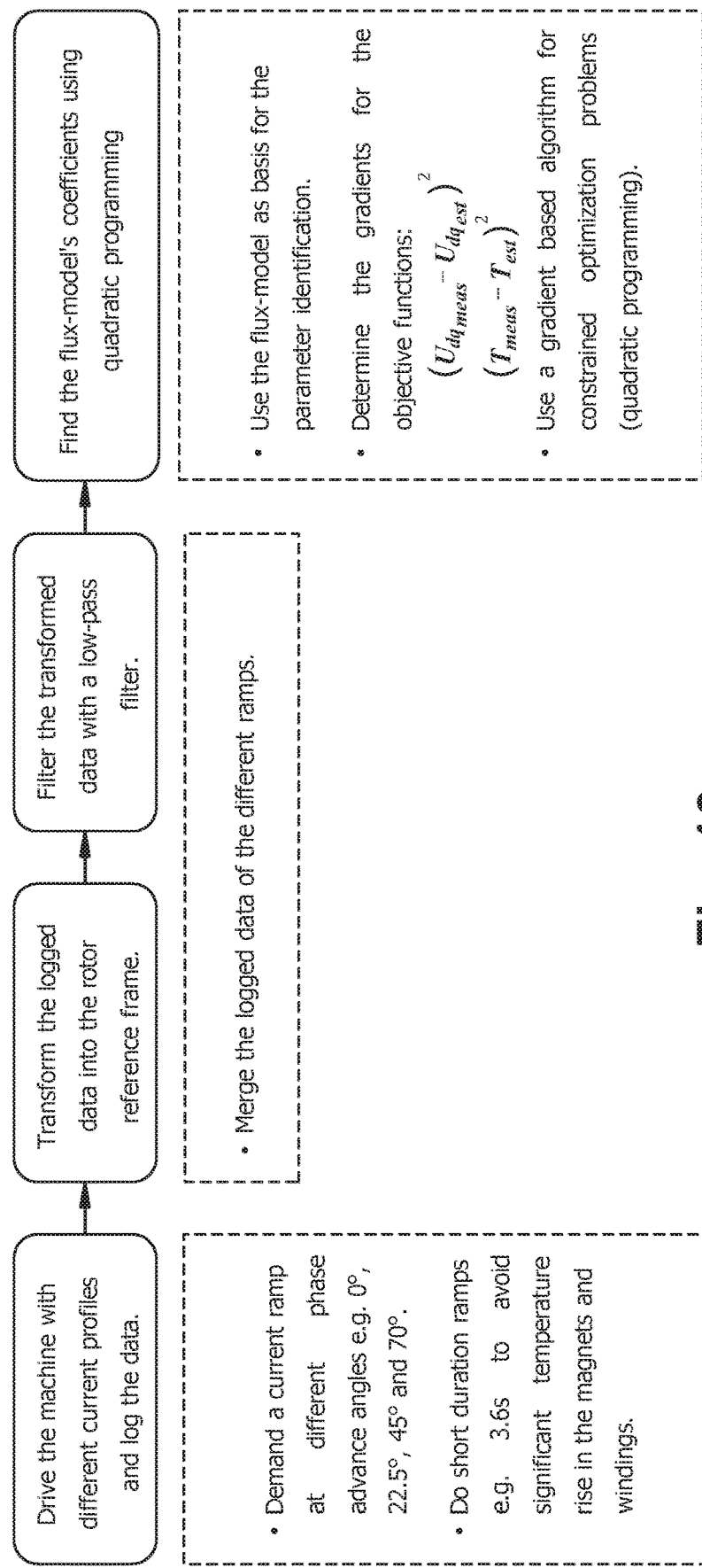
FIG. 13 is a more detailed representation of the steps carried out in the method of FIG. 12.

Second Exemplary Method—Offline Motor Parameter Measurement Using Measured Operational Parameters In a second exemplary method of determining the motor parameters, the actual motor—as opposed to a simulation of the motor—is operated in controlled offline conditions to allow for the efficient collection of sufficient operational values for the parameters of the model to be determined. This method is illustrated in FIGS. 12 and 13. By offline we mean at time when the motor is not otherwise being driven, so that that method takes full control of the currents applied to the motor and of the rotor position. Typically this will be performed with the motor on a test bench or in a test rig in a laboratory.

The method can be broken down into the following steps:

Step 1 Obtain a plurality of sets of operational values of the motor, each set corresponding to a different phase advance angle, This step may be carried out with the motor in a laboratory on a test bench but may also be carried out with the motor in situ, for instance in a vehicle, provided the currents applied to the motor can be controlled and the appropriate measurements obtained.

The object is to obtain an appropriate set of operational values that enable the values to be fitted to the model and to do so as quickly as possible. It is important to remember that the winding resistance and the permanent flux linkage are temperature dependent. So, the measurement should be carried out in a short period of time (few seconds) compared to the corresponding thermal time constants.

A suitable procedure may comprise driving the machine with a constant speed (below base speed) whilst the phase current magnitude is increased from zero to a maximum value at a fixed phase advance angle. A set of current ramps are therefore applied, and measurements are taken at multiple values along each ramp to generate multiple sets of measured operational values. These current measurements form the operational values.

This current ramp is repeated for different phase advance angles in order to cover one quadrant. Phase currents, terminal voltages, shaft torque and rotor position are logged at a rate of 5 MS/s for each current ramp for example.

Step 2 Transform the obtained values into the rotor dq reference frame

Figure 16:
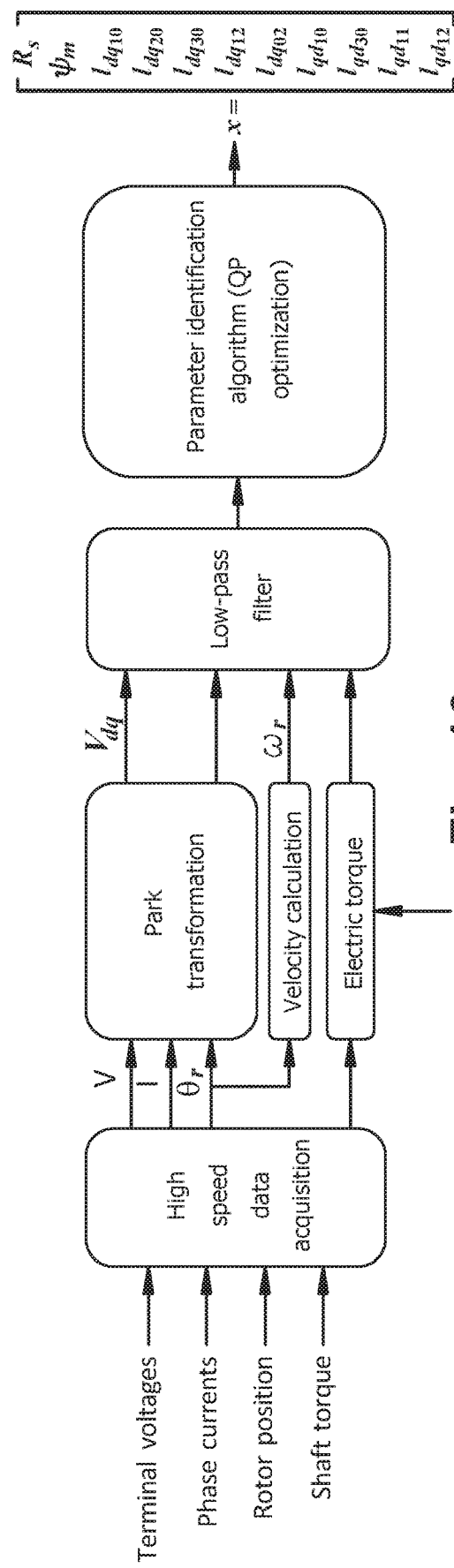
FIG. 16 is a schematic representation of further detail of the off line method showing the transformation of the operational values to the dq frame and the low pass filtering of the values.

In this step, the obtained values are transformed into the dq reference frame because this is the frame used by the model. Again, the transformed values are kept in their respective sets. The values are then passed through a low pass filter as shown in FIG. 16.

Step 3 Those skilled in the art will appreciate that sampling at a high data rate will yield many operational points corresponding to effectively the same d- and q-axis operating point. Consequently, in a preferred embodiment, after filtering the data to smooth effects of any noise present in the measurement signals, the measured points may be down sampled to improve the speed of the optimization process The skilled person will appreciate that the operational data could be obtained offline in different ways, For example the rotor could be locked in position and the current varied through a range of phase advance angles and magnitudes and measurements taken as they are varied.

Step 4 Fit the parameters of the model to the measured d-axis and q-axis voltages, d-axis and q-axis currents, and measured torque.

Recalling the machine model of equation (18), away from the flux model coefficients, the winding resistance enters as an additional parameter to be determined. From FIGS. 6 and 7 it is evident that the polynomial degree n=3 is sufficient to describe correctly the flux linkages of the machine in question. Substituting the flux linkage model equation (currently on page 3) in to the equations (33) and (34) (currently on page 7) for the d- and q-axis voltages gives:

$$u_d = R_s i_d - \omega_r (l_{qd10} i_q + l_{qd11} i_q i_d + l_{qd30} i_q^3 + l_{qd12} i_q i_d^2) + \quad (42)$$
$$(l_{dq10} + 2l_{dq20} i_d + l_{dq12} i_q^2 + 3l_{dq30} i_d^2) \frac{di_d}{dt} +$$
$$(2l_{dq02} i_q + 2l_{dq12} i_q i_d) \frac{di_1}{dt}$$

$$u_q = \quad (43)$$
$$R_s i_q + w_r \psi_m + \omega_r (l_{dq10} i_d + l_{dq02} i_q^2 + l_{dq20} i_d^2 + l_{dq12} i_d i_q^2 + l_{dq30} i_d^3) +$$
$$\omega_r (\psi_m + l_{dq02} i_q^2) + (l_{qd11} i_q + 2l_{qd12} i_q i_d) \frac{di_d}{dt} +$$
$$(l_{qd10} + l_{qd11} i_d + 3l_{qd30} i_q^2 + l_{qd12} i_d^2) \frac{di_q}{dt}$$

$$T_e(i_d, i_q) = \frac{3}{2} p(\psi_d(i_d, i_q) i_q - \psi_q(i_d, i_q) i_d) \quad (44)$$

Within equations (42), (43) and (44) there are 11 model parameters to be identified. Through sampling at a high data rate such as 5 Ms/s and operating a ramp for several seconds it is clear there is sufficient independent data points.

The terms that accompany the current derivatives in equations (42) and (43) correspond to the differential inductances.

It is envisaged that a range of different methods may be used for fitting the maps of the operational values, in these examples forming maps as 2D or 3D curves, to the model may be employed, but for this exemplary embodiment the method chosen to perform the curve fitting procedure was the minimization of the sum of the squared errors using a gradient base method. Quadratic programming was selected, because it was conceived to solve constrained nonlinear optimization problems with quadratic objective functions. The nature of the machine model defines some physical constraints.

The nature of the machine model defines some physical constraints.

$$R_s > 0;\ l_{dq01} > 0;\ l_{qd10} > 0;\ l_{qd10} > l_{dq10}$$

All these constraints define the region where the optimal solution should be found. The objective function is then defined with the help of equations (42), (43) and (44), where the letters with a hat notation represent the values of the estimated values and the letters with no hat notation the measured values. The magnitudes in the objective function may be normalized to appropriate reference magnitudes of the system in consideration, for example, d- and q-axis voltages to the nominal voltage rating for the machine to prevent squared errors with higher weighting having undue influence upon the optimization.

$$f(x) = \sum_{k=1}^{N} ((u_{d_k} - \widehat{u_{d_k}})^2 + (u_{q_k} - \widehat{u_{q_k}})^2 + (T_{e_k} - \widehat{T_{e_k}})^2) \quad (45)$$

Each squared error term can be rewritten in terms of gradients:

$$\widehat{u_d} = \nabla u_d^T x;\ \widehat{u_q} = \nabla u_q^T x;\ \widehat{T_e} = \nabla T_e^T x$$

Where $$x^T = [R_s\ \psi_m\ l_{dq02}\ l_{dq10}\ l_{dq20}\ l_{dq12}\ l_{dq30}\ l_{dq10}\ l_{qd11}\ l_{qd12}\ l_{qd30}]$$

$$\nabla u_d^T = \left[ i_d\ \ 0\ \ 2i_q \frac{di_q}{dt}\ \ \frac{di_d}{dt}\ \ 2i_d \frac{di_d}{dt}\ \ i_q^2 \frac{di_d}{dt} + 2i_q i_d \frac{di_q}{dt} \right.$$
$$\left. 3i_d^2 \frac{di_d}{dt}\ -i_q w_r\ -i_q i_d w_r\ -i_q i_d^2 w_r\ -i_q^3 w_r \right]$$

$$\nabla u_q^T = [\ i_q\ \ w_r\ \ i_q^2 w_r\ \ i_d w_r\ \ i_d^2 w_r\ \ i_q^2 i_d w_r\ \ i_d^3 w_r$$
$$\frac{di_q}{dt}\ \ i_q \frac{di_d}{dt} + i_d \frac{di_q}{dt}\ \ 2i_q i_d \frac{di_d}{dt} + i_d^2 \frac{di_q}{dt}\ \ 3i_q^2 \frac{di_q}{dt}\ ]$$

$$\nabla T_e^T = \frac{3}{2} p[\ i_q\ \ w_r\ \ i_q^2 w_r\ \ i_d w_r\ \ i_d^2 w_r\ \ i_q^2 i_d w_r\ \ i_d^3 w_r$$
$$\frac{di_q}{dt}\ \ i_q \frac{di_d}{dt} + i_d \frac{di_q}{dt}\ \ 2i_q i_d \frac{di_d}{dt} + i_d^2 \frac{di_q}{dt}\ \ 3i_q^2 \frac{di_q}{dt}\ ]$$

The quadratic programming problem has the following general form [11]:

Minimize $Q(x) = \frac{1}{2} x^T G x + g^T x$ $a_i^T x = b_i, i \in E$ $a_i^T x \geq b_i, i \in I$ \quad (46)

Where G is the Hessian $\nabla^2 f(x)$ of the objective function $f(x)$ and $g = \nabla f(x) - Gx$. The vectors $a_i$ and $b_i$ define the constraints of the problem.

Equations (33) and (34) are valid for the machine's fundamental harmonic. The terminal voltage and phase current signals are filtered to extract the fundamental. After that, they are transformed into the dq-frame. Those signals will still have some harmonic components produced by slotting, inverter dead time and even control related effects. For that reason, the transformed signals are low pass filtered again.

Figure 18:
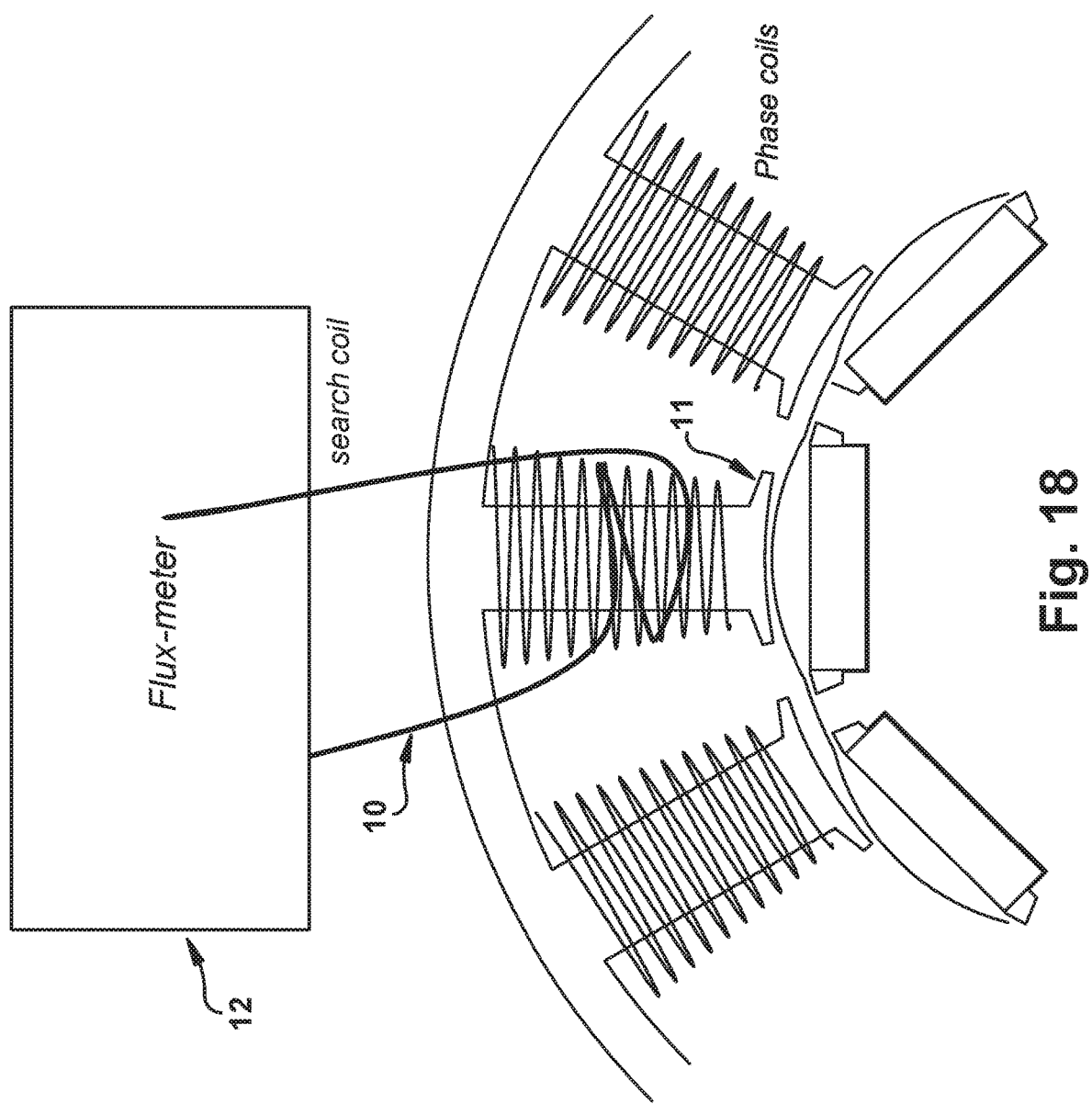
FIG. 18 shows an exemplary search coil that may be used to directly measure the flux linkage in the motor during the method of characterisation of the motor.

In a modification of this method, flux linkage values may be obtained directly by fitting of search coils to the motor. FIG. 18 shows a typical search coil 10 wound around a pole 11 of the motor. As shown the search coil is connected at both ends to a flux meter 12 that measures the flux. Current ramps would still be applied in exactly the same way, and the model fitted to the flux linkage measurements.

Experimental Results—Offline Method

A 4-pole pair sample motor was chosen and the first exemplary method was performed to characterize the motor in a laboratory. For comparison purposes the winding resistance was obtained through a four-point measurement (current/voltage), the permanent magnet flux-linkage was derived from a back-emf constant measurement. The linear d-axis inductances and the q-axis inductance were obtained from a line-line impedance measurement at low current, for comparison with the linear inductance based model. The inductance from the impedance is evaluated at certain rotor positions to determine the dq-axis inductances. The following parameters were obtained using the offline method and the novel motor model:

In the experiment the values of Rs was obtained by direct measurement from using a milliohm meter, the magnet flux from a back-emf measurement, the d- and q-axis inductance from measuring the motor terminal voltage, and also the phase currents, whilst essentially looking at the phase shift between them to determine the inductance, and finally through knowing the rotor position relating the inductance to the d- or q-axis.

TABLE II

TABLE II: Machine parameters comparison of ipmsm with 4 pole pairs.

|  |  | Measured | Identified | dev. |
|---|---|---|---|---|
| Winding resistance | Rs | 12.58 mΩ | 12.39 mΩ | −1.46% |
| Permanent flux linkage | $\psi m$ | 6.41 mV · s | 6.43 mV · s | 0.27% |
| D-axis inductance $L_{d0}$ | Idq10 | 56.52 µH | 57.25 µH | 1.47% |
| Q-axis inductance $L_{q0}$ | Iqd10 | 70.31 µH | 70.71 µH | 0.58% |

TABLE III identified cross coupling parameters of ipmsm with 4 pole pairs.

| Idq02 | −14.9 nH/A |
| Idq20 | −50.82 nH/A$^2$ |
| Idq12 | −0.62 nH/A$^2$ |
| Idq30 | −0.33 nH/A$^2$ |
| Iqd11 | −37.84 nH/A |
| Iqd12 | −0.43 nH/A$^2$ |
| Iqd30 | −0.17 nH/A$^2$ |

The method was also carried out using a different motor having 7 pole pairs and the following parameters were obtained:

TABLE IV

Machine parameters comparison of motor with 7 pole pairs.

|  |  | Measured | Identified | dev. |
|---|---|---|---|---|
| Winding resistance | $R_s$ | 9.92 mΩ | 9.8 mΩ | −1.15% |
| Permanent flux linkage | $\psi m$ | 4.15 mV · s | 4.18 mV · s | 0.72% |
| D-axis inductance $L_{d0}$ | Idq10 | 77.01 µH | 76.87 µH | −0.17% |
| Q-axis inductance $L_{q0}$ | Iqd10 | 77.82 µH | 78.6 µH | 1.01% |

TABLE V

Identified cross coupling parameters of motor with 7 pole pairs.

| Idq02 | −19.18 nH/A |
| Idq20 | −87.36 nH/A$^2$ |
| Idq12 | −0.51 nH/A$^2$ |
| Idq30 | −0.56 nH/A$^2$ |
| Iqd11 | −26.11 nH/A |
| Iqd12 | −0.16 nH/A$^2$ |
| Iqd30 | −0.3 nH/A$^2$ |

The above results demonstrate that machine parameters were successfully identified with deviations below 1.5% for an interior PMSM and a surface mounted PMSM. The deviations appreciated in tables II and IV are mainly caused by rotor position errors and core losses.

A general model and method of use of the model for the flux linkage of permanent magnet synchronous machines with consideration of cross-coupling has been provided. The order of the proposed flux model depends on the polynomial degree. Conversely, there are a variety of inductance based models with different model orders. This is a strong advantage of the flux-based model of the present invention over other models. For example, if the degree of the polynomials in (33) and (34 is n=1, the resultant model order would correspond to the classical linear machine model with constant dq-inductances and no cross-coupling terms. On the other hand when n=3 it would deliver a relatively accurate model (see FIGS. 6 and 7) in terms of mutual and cross-coupling effects. The method of the invention may be applied to the model with any order.

Higher fidelity optimisation can be easily done by having the correspondingly higher model order (e.g. n=5). Accurate torque and efficiency predictions are possible through using the characterised motor model obtained through following the method explained above.

Third Exemplary Method—Online Motor Parameter Measurement

Figure 14:
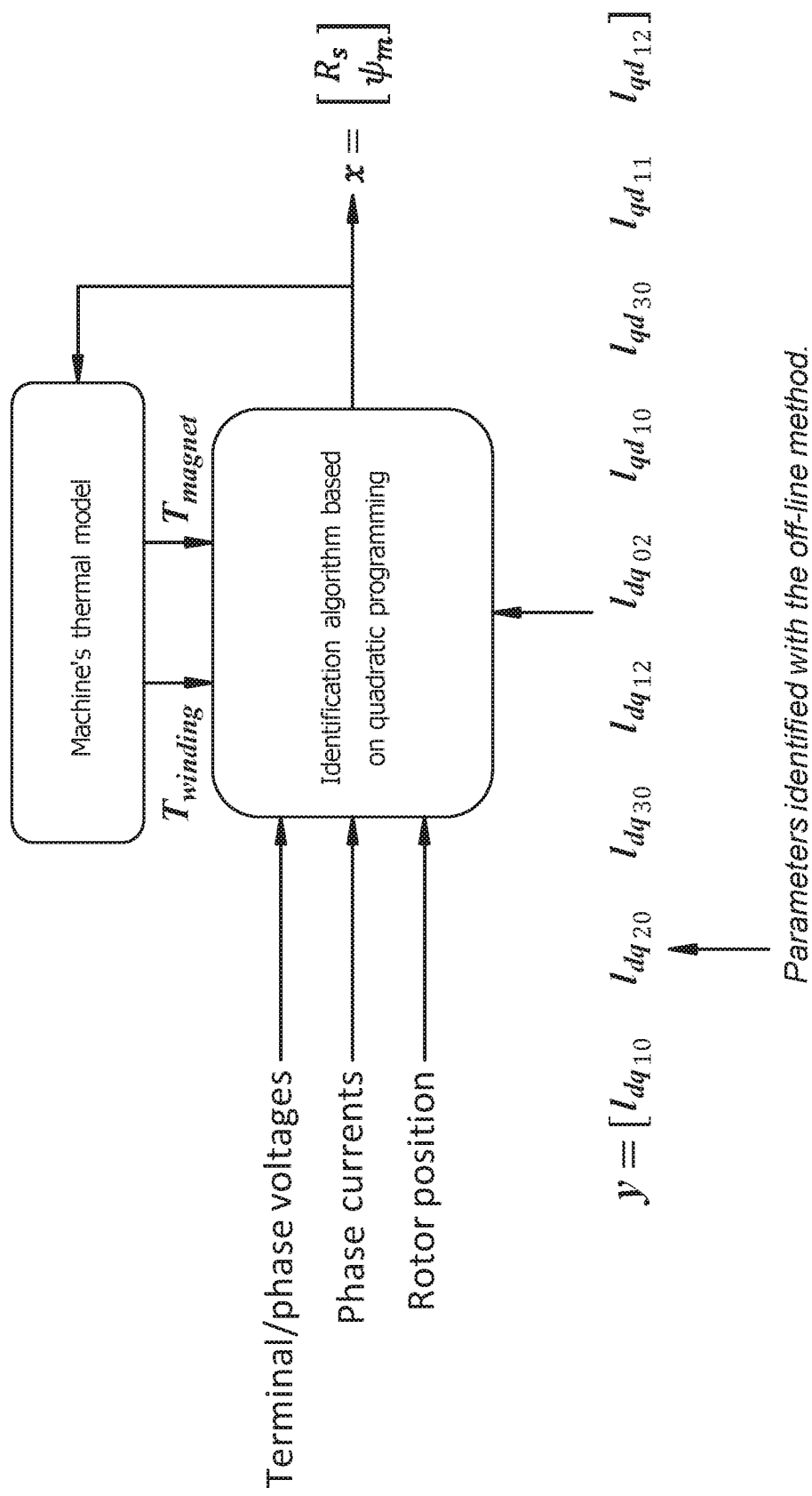
FIG. 14 is a schematic representation of a second embodiment of a method for optimising the parameters of a model using a combination of online operational values and pre-obtained offline values.
Figure 15:
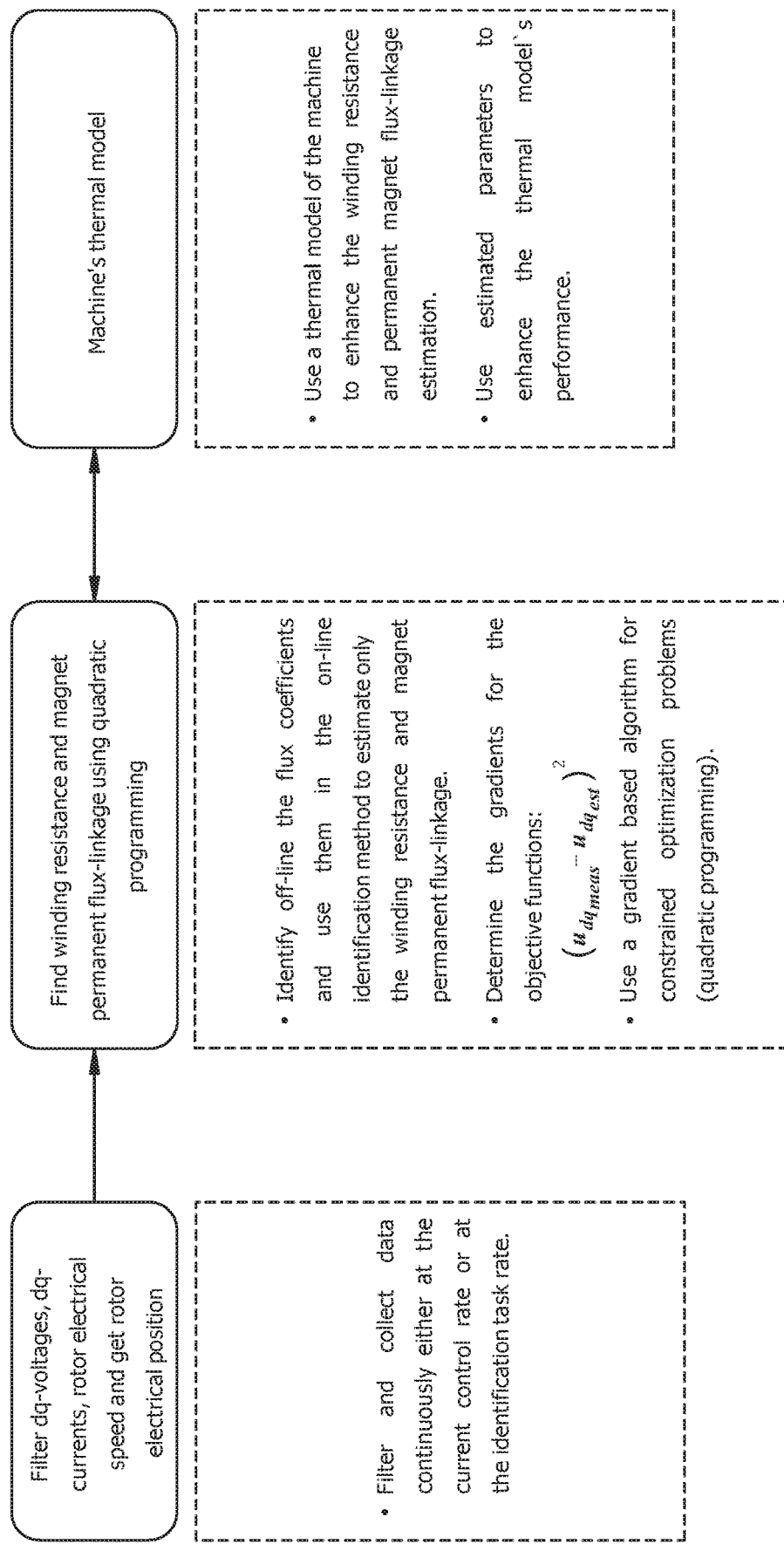
FIG. 15 is a more detailed representation of the steps carried out in the method of FIG. 12.

As an alternative to the offline method set out above, the applicant has appreciated that the novel parametric model may be used to determine one or more of the parameters when the motor is in use, a so called on-line method of motor characterization. This method is illustrated in FIGS. 14 and 15.

In this online method, a set of parameters are first obtained using the same model proposed for the offline method and the same methodology for obtaining operational motor values including the motor phase voltages and currents, motor rotor position and motor torque.

Once these have been obtained, those parameters which are thermally insensitive such as the cross coupling between d-axis flux and q-axis flux are retained and those which are temperature dependent are identified during use of the motor. Parameter values identified offline may be used to constrain parameter values identified online to realistic values. For example if the phase resistance of a copper winding is known to be 10 mOhm at room temperature, then allowing for a spread of production tolerances and considering the environmental conditions the motor is deployed within and anticipating some self-heating within the winding, allows constraints to be placed upon the online optimization. Conversely, if no, or a very wide range of values are allowed, a value outside of the anticipated normal range could be used to detect an abnormality has occurred within the motor, controller or data acquisition.

During the use of the motor, measurements of motor operational values are then obtained including the motor phase voltage and motor phase currents and the motor rotor position. The later allows the voltages and currents to be transformed into the rotor reference frame. The motor torque does not need to be measured in this online part of the method, although if available the accuracy of the motor parameters obtained can be improved. A further check of the validity of the motor parameter provided by the model is available by calculating the torque produced by the motor using the model parameters, and comparing it to the range of credible values the system is designed for.

Through tracking the variation of model parameters with time during model operation, further checks can be made upon the validity of the identified model parameters. For example, if the magnet flux identified by the procedure suddenly doubled within a few milliseconds when the thermal time constant of the motor is several orders of magnitudes longer, it would call in to question the validity of the parameter values or the operating state of the motor and controller.

Through comparing the temperature dependent parameter values identified online, with those identified offline for the same motor allows the temperature change to be identified. To do this required knowledge of the temperature coefficient relating the material property to temperature. For example the electrical resistivity of a winding.

Within a volume production run of many nominally identical motors there will be mechanical and material tolerances. Identified model parameters found on online will therefore likely differ from model parameters obtained from a pre-production laboratory sample at the same temperature and motor operating point. Provided the parameter values identified online are within the anticipated range for the motor operating temperature their numerical absolute values may not be so useful as the parameter variation over time. For example if two sets of measurements are taken 10 seconds apart in an online system, and the model parameters are identified after each measurement, and the winding resistance is found to have increased by 20% and the magnet flux reduced by 4% from the following equations the temperature of the winding can be deduced to have risen by approximately 50 degrees Celsius, and the magnet temperature to have risen by approximately 36 degrees Celsius.

$$\frac{R_{s_{t=10s}}}{R_{s_{t=0s}}} = 1 + (T_{winding} - 20)\frac{0.393}{100} \quad (47)$$

$$\frac{\psi_{m_{t=10s}}}{\psi_{m_{t=0s}}} = 1 - (T_{magnet} - 20)\frac{0.110}{100} \quad (48)$$

Where in the above equations $T_{winding}$ the winding temperature in degrees Celsius and $T_{magnet}$ is the magnet temperature in Degrees Celsius and the winding is substantially made from copper and the magnet substantially from an alloy of Neodymium iron and boron.

Batches of measurements of operational values are obtained containing at least the number of unique sample points corresponding to the number of unknown parameters of the model. For example if only Rs, magnet flux and temperature are unknown, then a minimum of 3 measurement samples are needed. More samples will help improve the accuracy of the model but will take longer to compute. The skilled person will appreciate the need to balance accuracy of an individual iteration of the model parameter calculation with the resources available to sample the necessary signals and the time available within a task scheduler in an online system to perform the computations. >Unlike the offline method, the retained parameters are used as constraints to the model so only the temperature dependent, and parameters need to be determined.

Figure 17:
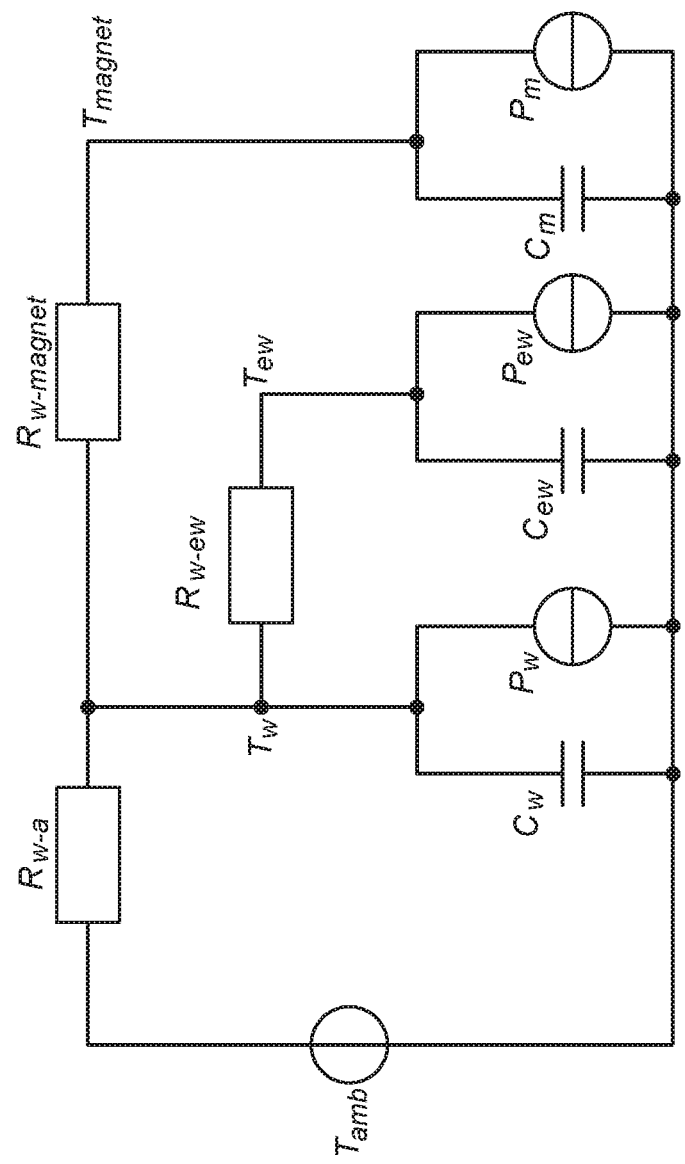
FIG. 17 is a simplified schematic representation of a motor thermal model of a permanent magnet synchronous motor using equivalent thermal resistances and capacitances.

Depending on how the measurements are collected, it may be some time before enough measurements are available for an update of the parameters to be made. In this time, the temperature of the motor parts may have varied, which will affect the accuracy of the modelling. To ameliorate this, the method may include use of a motor thermal model. Such a lumped parameter thermal model is illustrated in FIG. 17. Other models produced by statistical approaches such as through 'design of experiments' or by computer calculation using finite element analysis could be used. Within the thermal model of FIG. 17 the power loss within the motor windings is calculated based upon measured values used within the current controller of the 'control' block in FIG. 18. Many readers will be familiar with thermal equivalent circuits where thermal resistance and thermal capacitance are analogues of resistance and capacitance in an electrical circuit. Similarly power loss within a winding in a thermal equivalent circuit is the analogue of current in an electrical circuit, and temperature difference the analogue of potential difference in an electrical circuit. Thermal equivalent circuits are solved using the same methods and equations as electrical equivalent circuits. The thermal equivalent circuit of FIG. 17 is highly simplified and only contains a few components for the purposes of illustration. By studying the thermal circuit the reader will appreciate that heat generated within the windings through the resistive losses (calculated according to the square of the instantaneous current multiplied by the electrical resistance) is predominantly passing through the thermal resistance to the stator material, then through the housing material to either the ambient or mounting face of the motor. A parallel thermal path also exists from the housing through the bearing, and in to the rotor to the magnets. Those skilled in the art will appreciate that more complicated, higher fidelity thermal equivalent circuits including effects of convection, radiation, and forced cooling are well known and utilised.

In use the thermal model calculates the electrical losses and then solves for the temperatures at points within the thermal equivalent circuit. Ideally at least one of the temperatures calculated within the equivalent circuit is known. For example by means of a thermistor monitoring the temperature of the air around the motor. The difference between the known measured temperatures and those estimated in the model can then be included in the least squares objective function alongside the temperature dependent motor parameters such as stator winding resistance and magnet flux.

In cases where a direct measurement of temperature is unavailable, the thermal model is used to obtain a prediction of how much the temperatures should have changed by since there was enough measurement data available to compute the temperature dependent parameters. This allows additional constraints to be applied to the optimization of the temperature dependent motor parameters. It is likely that assumptions about the environmental temperature surrounding the motor will need to be made in these instances. Similarly some of the thermal resistances within a typical thermal equivalent circuit will likely vary non-linearly with temperature. Consequently a suitable tolerance for errors within the thermal model will need to be applied so the constraints applied to the motor parameter optimization. Such tolerance limits could be obtained through a series of offline tests upon the motor when validating the motor thermal model against measured temperatures in both stalled and rotating conditions at various ambient temperatures with the motor operating in an environmental chamber.

By fixing a sub-set of motor parameters during the offline stage of the method, the temperature change can be inferred from the variation identified in the motor resistance and magnet flux. This will allow the temperature of the windings and magnet or other parts of the motor to be measured accurately without additional sensors.

In an alternative, rather than using real measurements obtained offline, the parameters may be obtained using computer modelling of the motor. In essence with this version of the online method the machine's parameter identification is divided in two categories; parameter identification from modelled, e.g. finite element (FE) data, and parameter identification from measurements.

The parameter identification using FE data focuses on the identification of the coefficients of (33) and (34) for a given model order n. The flux model coefficients are then optimized to fit the reference flux linkage curves. Therefore, the objective function for the optimization is the sum of the squared errors of the dq-axes flux linkages. On the other hand, the parameter identification using measured data is based on the rotor reference frame voltages (dq-voltages) of the machine. To find the optimal coefficients, the sum of the squared errors of the normalized dq-voltages and normalized electric torque are minimized. However, the identifications using FE data and using measurements are performed with the same optimization method.

The skilled reader will appreciate that new offline (lab based) motor parameter calibration method of the invention may offer more data in a shorter time over existing approaches. All machine parameters are identified with one procedure, including magnetic saturation and cross-coupling.

The exemplary online method does not require high speed operation of the motor and can be implemented even with the rotor locked. The method can be implemented using motor current and voltage waveforms of an essentially balanced sinusoidal form as used for normal operation of the motor. Production of special test waveforms, or square waves is not required. The characterisation process can be combined with other experimental work to identify the optimal operating point of the motor and therefore yield a further time saving. The same inverter and control electronics can be utilised as used with the motor in normal operation. All that is required is the facility to vary the phase advance and current magnitude; knowledge of the rotor position (which is usually available and needed by the control electronics;) the motor phase voltages and currents; and optionally for additional accuracy the motor torque. These signals can be readily logged using low cost off-the-shelf data transducers and a multi-channel oscilloscope, data acquisition system or simple microcontroller configured as a data logger The on-line method can be used to build-up a detailed characterisation model of a motor over time as more operating conditions are encountered. However by using a combination of parameters obtained from the off-line measurement, and identifying a sub-set of parameters online, information about temperature or other operating state dependent motor parameters can be elucidated without adding additional sensors to the online system. In the case of a permanent magnet synchronous motor Whilst the foregoing has discussed the invention disclosed here with reference to permanent magnet synchronous motors, those skilled in the art will appreciate the underlying power series model and test methods disclosed to identify the parameters of the model can be applied to other forms of motor for which the classical dq model is applicable. For example, the synchronous reluctance motor and wound field synchronous machine.

The invention claimed is:

1. A method comprising the steps of:
   Obtaining a plurality of winding flux linkage values or terminal voltages of a motor, each corresponding to a different combination of phase current magnitude and phase advance,
   Transforming the plurality of flux-linkage values or terminal voltages of the motor into a rotor dq reference frame to provide one or more dq-axis flux-linkage values or terminal voltages,
   Fitting the flux linkage model to the one or more dq-axis flux-linkage values or terminal voltages and their linked phase current magnitude and phase advance using a process of parametric optimization, wherein fitting the flux linkage model to the one or more dq-axis flux-linkage values or terminal voltages and their linked phase current magnitude and phase advance comprises:
   using the one or more dq-axis flux-linkage values or terminal voltages to generate at least one map for the d-axis and q-axis flux-linkages, each of the at least one map grouping together flux linkage values or terminal voltages having a common phase advance, and
   fitting the flux linkage model to the at least one map using a process of parametric optimisation;
   receiving a torque demand signal at an electric power steering system associated with the motor; and
   applying, via the motor, a torque to a part of a steering mechanism according to the flux linkage model and the torque demand signal.

2. The method of claim 1 where the step of fitting the model comprises use of a flux linkage model that includes effects of saturation for the fitting of the flux linkage model to the one or more dq-axis flux-linkage values or terminal voltages and their linked phase current magnitude and phase advance.

3. The method of claim 1 where the step of fitting the model comprises use of a flux linkage model that includes effects of cross-coupling between d- and q-axes.

4. A method according to claim 1 in which the flux linkage model utilises a power series based upon Taylor's theorem for multivariable functions.

5. A method according to claim 1 in which the step of obtaining the plurality of winding flux linkage values comprises obtaining the values through a finite element simulation of the motor.

6. A method according to claim 1 in which the step of fitting of the model to the map or maps comprises a quadratic parameterisation process whereby parameters of the flux linkage model are determined using a gradient based method to minimize a sum of squared errors in the quadratic parameterization process.

7. A method according to claim 1 which comprises fitting of a model that comprises two equations for d-axis and q-axis flux linkages respectively of the form:

$$\psi_d(i_d, i_q) = \sum_{m=0}^{P} \sum_{i=0}^{n-2m} l_{dq(i)(2m)} i_d^i i_q^{(2m)} \quad (1)$$

Where $$P = \frac{n - \mathrm{mod}(n, 2)}{2} \bigg| n \in N_0$$

And $$\psi_q(i_d, i_q) = \sum_{m=0}^{P} \sum_{i=0}^{n-(2m+1)} l_{qd(2m+1)(i)} i_q^{(2m+1)} i_d^i \quad (2)$$

where, $$P = \frac{(n-1) - \mathrm{mod}((n-1), 2)}{2} \bigg| n \in N^+$$

Where the parameters with the suffixes d or q represent quantities in the d-q frame, such as voltage (u), current (i), flux-linkage ($\psi$), and inductances (l), N0 is the set of natural numbers, including zero, N+ is the set of positive natural numbers, n is the model order, $l_{dq_{00}}$ is the permanent flux-linkage ($\psi_m$), $l_{dq_{10}}$ and $l_{qd_{10}}$ are the linear dq-inductances used in the classical dq model and the remaining coefficients correspond to the saturation and cross-coupling terms.

8. A method according to claim 7 in which the fitting of the model optimises the model coefficients to determine values for the following parameters of the motor:
magnetic permanent flux-linkage $\psi_m$
cross coupling between d-axis and q-axis fluxes; and
dq-inductances.

9. A method according to claim 1 in which the plurality of winding flux linkage values or terminal voltages of the motor are obtained by measurement of the winding flux linkage values directly or by measuring operational parameters from which the winding flux linkage values can be calculated or which are known to be a function of the winding flux linkage values such as the terminal voltages.

10. A method according to claim 9 in which the step of obtaining a plurality of winding flux linkage values comprises obtaining operational values from which the flux linkage values can be derived, the operational values including one or more of the following:
The motor phase voltages, meaning the voltage applied to each phase of the motor;
The motor phase currents, meaning the current flowing in each phase of the motor;
The rotor angular position.

11. A method according to claim 10 in which the step of obtaining a plurality of winding flux linkage values comprises obtaining operational values from which the flux linkage values can be derived, the operational values including a measured value of a torque of the motor.

12. A method according to claim 9 in which the measurements include direct measurement of the flux-linkage in each phase of the motor using a plurality of search coils each associated with a respective phase.

13. A method according claim 9 comprising measuring at least some of the operational parameters, or directly measuring the winding flux linkage values, when the motor is offline by applying a set of current ramps to the motor, with each ramp generating a plurality of the operational parameters or winding flux linkage values and each ramp corresponding to a different phase advance angle of the motor currents.

14. A method according to claim 1 comprising measuring the plurality of winding flux linkage values or terminal voltages of the motor during use of the motor, in an online operation.

15. A method according to claim 14 in which one or more parameters of the flux linkage model are predefined such that the step of fitting the flux linkage model to the one or more dq-axis flux-linkage values or terminal voltages and their linked phase current magnitude and phase advance comprises fitting only a set of unknown parameters associated with the flux linkage model.

16. A method according to claim 14 comprising applying a thermal model of the motor to the measured operational values when fitting to the flux linkage model to at least partially account for the temperature of parts of the motor.

17. A method according to claim 14 further comprising:
Measuring a plurality of sets of winding flux linkage values or terminal voltages of the motor when the motor is offline, each set corresponding to a different phase advance angle or phase current,
Transforming the measured plurality of sets of winding flux linkage values or terminal voltages of the motor into the rotor dq reference frame
measuring a temperature of the windings or magnets and the step of fitting the flux linkage model is constrained using one or more of a set of parameters, but less than all of the set of parameters, obtained from the plurality of sets of winding flux linkage values or terminal voltages of the motor when the motor is offline.

18. A method according to claim 17 in which the following measurements are made when the motor is online: the phase terminal voltages, phase currents and rotor position.

19. A method according to claim 18 comprising determining a temperature of parts of the motor such as one or more magnets associated with the model and a set of coil windings associated with the plurality of winding flux linkage values by inference from a variation identified in the motor resistance and magnet flux over time.

20. A method according to claim 14 comprising, at a time when less than a maximum torque is demanded, adjusting the input current to put more current on the d-axis without producing more torque to generate additional unique winding flux linkage values or terminal voltages of the motor without impacting the operation of the motor.

21. A motor modelling apparatus comprising a processor, a memory and a set of programme instructions stored in the memory which when executed by the processor cause the apparatus to carry out a method according to claim 1.

22. A motor modelling apparatus according to claim 21 in which the programme instructions are located remote from the processor and the memory and the apparatus includes communication means for access of the instructions by the processor across a network such as the world wide web.

23. The method of claim 1, wherein the motor is a permanent magnet synchronous motor.

24. A method comprising the steps of:
obtaining a plurality of winding flux linkage values or terminal voltages of the motor, each corresponding to a different combination of phase current magnitude and phase advance via one of measurement of the winding flux linkage values directly and measuring operational parameters from which the winding flux linkage values can be calculated or which are known to be a function of the winding flux linkage values such as the terminal voltage, at least some of plurality of winding flux linkage values or terminal voltages of the motor being obtained when the motor is offline by applying a set of current ramps to the motor, with each ramp generating a set of plurality of winding flux linkage values or terminal voltages of the motor and each ramp corresponding to a different phase advance angle of the motor currents;
transforming the plurality of flux linkage values or terminal voltages of the motor into a rotor dq reference frame to provide one or more dq-axis flux-linkage values or terminal voltages;
fitting the flux linkage model to the one or more dq-axis flux-linkage values or terminal voltages and their linked phase current magnitude and phase advance using a process of parametric optimization;
receiving a torque demand signal at an electric power steering system associated with the motor; and
applying, via the motor, a torque to a part of a steering mechanism according to the flux linkage model and the torque demand signal.

25. A method comprising the steps of:
obtaining a plurality of winding flux linkage values or terminal voltages of the motor, each corresponding to a different combination of phase current magnitude and phase advance during use of the motor, in an online operation, a subset of the plurality of winding flux linkage values or terminal voltages of the motor being obtained at a time when less than a maximum torque of the motor is demanded by adjusting the input current to put more current on the d-axis without producing more torque to generate the subset of the plurality of winding flux linkage values or terminal voltages of the motor without impacting the operation of the motor;
transforming the plurality of flux-linkage values or terminal voltages of the motor into a rotor dq reference frame to provide one or more dq-axis flux-linkage values or terminal voltage;
Fitting the flux linkage model to the one or more dq-axis flux-linkage values or terminal voltages and their linked phase current magnitude and phase advance using a process of parametric optimization;
receiving a torque demand signal at an electric power steering system associated with the motor; and
applying, via the motor, a torque to a part of a steering mechanism according to the flux linkage model and the torque demand signal.

* * * * *